United States Patent
Zhang et al.

(10) Patent No.: US 7,603,557 B2
(45) Date of Patent: Oct. 13, 2009

(54) COMMUNICATION DEVICE, COMMUNICATION SYSTEM AND AUTHENTICATION METHOD

(75) Inventors: Yibo Zhang, Osaka (JP); Takeshi Kokado, Kyoto (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 10/579,628

(22) PCT Filed: Apr. 12, 2005

(86) PCT No.: PCT/JP2005/007096

§ 371 (c)(1),
(2), (4) Date: May 17, 2006

(87) PCT Pub. No.: WO2005/101727

PCT Pub. Date: Oct. 27, 2005

(65) Prior Publication Data

US 2007/0106894 A1    May 10, 2007

(30) Foreign Application Priority Data

Apr. 15, 2004  (JP) .............................. 2004-120132
May 18, 2004  (JP) .............................. 2004-147422

(51) Int. Cl.
  *H04L 9/00*    (2006.01)
  *H04L 9/32*    (2006.01)
  *G06F 7/04*    (2006.01)
(52) U.S. Cl. ...................... 713/170; 713/168; 713/169; 713/171; 713/172; 713/731; 726/3; 726/4; 726/5; 726/6; 726/7; 380/277; 380/278; 380/279; 380/280; 380/281

(58) Field of Classification Search .................. 713/170
See application file for complete search history.

(56) References Cited

U.S. PATENT DOCUMENTS 7,096,352 B2 * 8/2006 Kang et al. .................. 713/152

(Continued)

FOREIGN PATENT DOCUMENTS

JP          11-030953         2/1999

(Continued)

OTHER PUBLICATIONS

"Nikkei Personal Computing", Nikkei Business Publications, Inc., pp. 22, Nov. 24, 2003 (with English translation).

*Primary Examiner*—Longbit Chai
(74) *Attorney, Agent, or Firm*—Wenderoth, Lind & Ponack, L.L.P.

(57) ABSTRACT

A communication device, a communication system and an authentication system for preventing a disguising act by an illegal man-in-the-middle and improving the safety and certainty of authentication processing are provided. A slave (20) transmits an authentication request including device information to a master (10). The master (10) receives the authentication request and displays the device information included in the authentication request on a screen of a display section (13). The user visually checks the device information displayed on the screen of the display section 13 (13), determines whether or not to verify the authentication, and instructs the master (10) of the determination result via an input section (14). The master (10), instructed to verify or not to verify the authentication, transmits a response in accordance with the instruction to the slave (20).

18 Claims, 28 Drawing Sheets

U.S. PATENT DOCUMENTS

| | | | | |
|---|---|---|---|---|
| 7,464,402 | B2 * | 12/2008 | Briscoe et al. | 726/5 |
| 2001/0048744 | A1 * | 12/2001 | Kimura | 380/247 |

FOREIGN PATENT DOCUMENTS

| JP | 11-313237 | | 11/1999 |
| --- | --- | --- | --- |
| JP | 2001-345819 | | 12/2001 |
| JP | 2002-026899 | * | 1/2002 |
| JP | 2002-159053 | | 5/2002 |
| JP | 2002-271318 | | 9/2002 |
| JP | 2003-005641 | | 1/2003 |
| JP | 2003-037592 | | 2/2003 |
| JP | 2004-215232 | | 7/2004 |
| KR | 2003-005604 | * | 1/2003 |

\* cited by examiner

F I G. 4 A
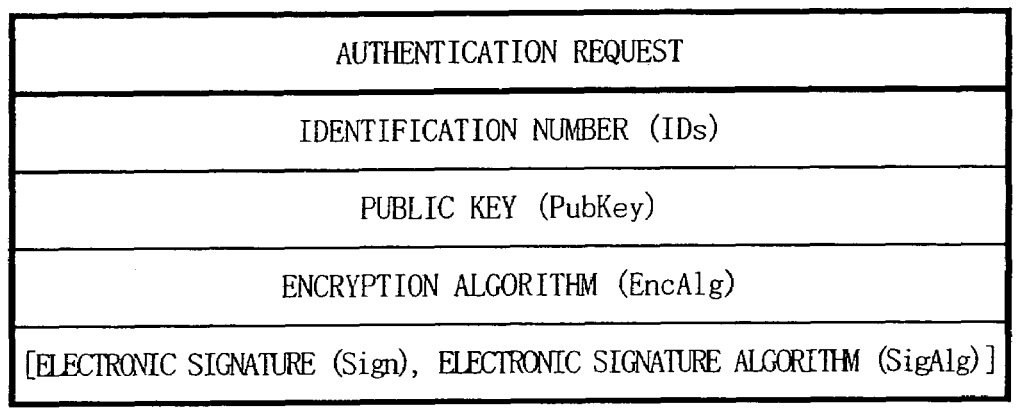
F I G. 4 B
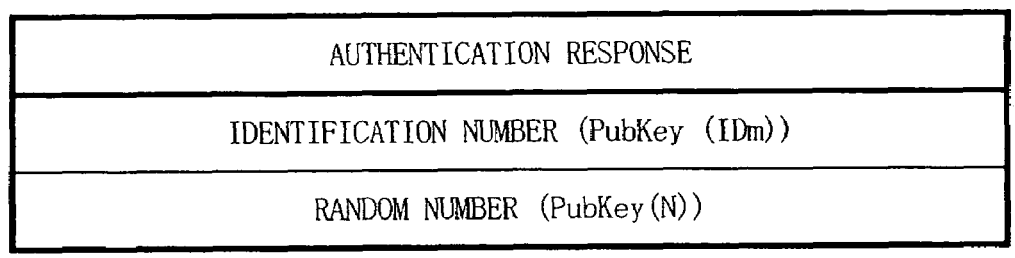

ID:PANA-00001  Key:ARocketToTheMoon
ID:PANA-00002  Key:MySecretFavorite

[OK]  [NG]

COMMUNICATION DEVICE, COMMUNICATION SYSTEM AND AUTHENTICATION METHOD

TECHNICAL FIELD

The present invention relates to an communication device, a communication system and an authentication method, and in particular to a communication device for realizing both of security improvement and simplification of security setting for authenticated connection between communication devices via a wireless LAN or the like, a communication system including such a communication device, and an authentication method carried out by such a communication system.

BACKGROUND ART

Recently, in-house or other types of wireless LANs have been spreading along with the improvement of wireless LAN technologies. Although not requiring troublesome line connections which are needed for a wired LAN, a wireless LAN requires various types of settings for wireless connection. Especially, settings on security, which are absolutely indispensable for the wireless LAN, are specialized and complicated and therefore difficult for general users not familiar with the technology. For example, IEEE Standard 802.11i defines a connection procedure including two elements of authentication and key generation, and has a precondition that a client and an authentication server or an access point (AP) have common information for authentication beforehand. In order to more widely spread in-house wireless LANs, simplification of the setting procedure is one of the unavoidable issues.

Methods conventionally proposed in order to solve this problem will be now described.

A first method is for performing mutual authentication between an AP and a client using wireless communication (see patent document 1). According to the first method, buttons which are installed on both sides are pushed simultaneously to lower the wireless output power on both sides. Thus, the devices are put into a special setting mode and settings are performed automatically. The first method controls the wireless output power to generate a certain type of secret communication between an AP and a client so as to perform mutual authentication and settings.

A second method is for performing mutual authentication between a master and a slave using wireless communication (see FIG. 35 and patent document 2). According to the second method, a master and a slave share a common key beforehand. For starting authentication, an authentication request is transmitted from the slave to the master. The master transmits a challenge instruction to the slave. The slave transmits an authentication request including a challenge encrypted by a common key to the master. The master decrypts the encrypted challenge by its own common key. When the decrypted challenge matches the challenge already transmitted to the slave, the master returns a response indicating that the authentication is verified or not verified to the slave in accordance with an instruction from the user.

A third method is for performing mutual authentication between a master and a slave using wireless communication (see FIG. 36 and patent document 3). The third method is performed as follows. A master and a slave each receive pushing of a registration button. The slave transmits a registration application including its own public key and inherent information to the master. The master transmits a registration confirmation including the inherent information of the slave, which is encrypted by the public key of the slave, to the slave. Then, the master transmits an authentication notification including a common key of the master, which is encrypted by the public key of the slave, to the slave. The slave transmits an authentication receipt including an authentication response, which is encrypted by a common key of the master, to the master.

A fourth method is for performing mutual authentication between two communication devices each including display means using wireless communication (see FIG. 37 and patent document 4). The fourth method is performed as follows. A communication device A transmits a key transmission message including its own public key to a communication device B. The public key is converted into another value by each of the communication device A and the communication device B, and is output using visual means or audial means of each of the communication devices. The user checks whether or not the values of the public key converted and output match each other and determines whether or not to verify the authentication. When the authentication is verified, the communication device B transmits new key generation information encrypted by the public key of the communication device A to the communication device A. Then, the communication device A and the communication device B generate a common encryption key for communication based on the new key generation information.

Patent document 1: Japanese Laid-Open Patent Publication No. 2004-215232

Patent document 2: Japanese Patent No. 3585422

Patent document 3: Japanese Patent No. 3628250

Patent document 4: Japanese Patent No. 3552648

DISCLOSURE OF THE INVENTION

Problems to be Solved by the Invention

With the first method, the following risk cannot be completely eliminated: in the case where there is another client having the same type of wireless LAN interface in the range where the wireless radio wave can reach, the AP is connected with this another client. The reason for this is that the same settings may be possibly made in a neighboring house. The first method has another problem that mutual authentication is automatically performed without the user checking via display means.

The second method requires input means such as a keyboard or the like in order to input the common key to be shared. This is not suitable to networked consumer electronics provided with no keyboard or the like.

With the third method, in the case where there is an illegal man-in-the-middle in the registration application processing, the "disguising act" of the man-in-the-middle performed by changing the public key cannot be prevented.

The fourth method requires both the communication device A and the communication device B to have display means. In addition, since the fourth method merely displays and checks the converted values of the public key, there remains a possibility that an illegal man-in-the-middle can perform a disguising act by changing the public key into a public key having another converted value which is similar to, and almost undistinguishable from, the original value by the eye or ear of the user.

Therefore, an object of the present invention is to provide a communication device, a communication system and an authentication method for improving the safety and certainty of authentication processing by preventing a disguising act of an illegal man-in-the-middle.

Solution to the Problems

The present invention is directed to a communication device requested for authentication for connection from another communication device, a communication device requesting another communication device for authentication for connection, a communication system including these communication devices, and an authentication method carried out by such a communication system.

To achieve the above object, a communication device according to the present invention requested for authentication comprises a receiving section for receiving, from another communication device, an authentication request including device information capable of uniquely specifying the another communication device; a display section for displaying the device information included in the authentication request on a screen thereof; an input section for receiving an input instruction determined by a user based on the screen of the display section; and an authentication section for executing processing of verifying or not verifying the authentication with the another communication device in accordance with the instruction input to the input section.

A communication device according to the present invention requesting for authentication comprises a transmission section for transmitting an authentication request including device information capable of uniquely specifying the communication device to another communication device; a receiving section for receiving an authentication response including device information corresponding to the authentication request from the another communication device; a display section for displaying the device information included in the authentication response on a screen thereof; an input section for receiving an input instruction determined by a user based on the screen of the display section; and an authentication section for executing processing of verifying or not verifying the authentication with the another communication device in accordance with the instruction input to the input section.

According to the present invention, only either one of the communication device requested for authentication and the communication device requesting for authentication needs to include a display device.

When the receiving section receives a plurality of authentication requests from a plurality of the another communication devices, the display section may simultaneously display a plurality of pieces of device information included in the plurality of authentication requests. When there is no instruction from the user to the input section within a predetermined time period, the authentication section may execute processing of not verifying the authentication of the another communication device. Typical device information includes an identification number and at least one of a public key and an electronic signature of the communication device. Preferably, in the authentication section, a common encryption key is generated using the identification number included in the authentication request received from the another communication device.

EFFECT OF THE INVENTION

According to the present invention described above, device information of a slave requesting for authentication is displayed on the side of a master, or device information of the master is displayed on the side of the slave. This allows the user to easily determine whether or not the communication device which has transmitted the authentication request is a slave or a master to be authenticated. Thus, the safety and certainty of authentication processing can be improved. In the case where a common encryption key is generated using the device information (ID) confirmed on the screen, the secrecy in the actual communication can be further improved.

BRIEF DESCRIPTION OF THE DRAWINGS

FIG. 4A shows an example of an authentication request.

FIG. 4B shows an example of an authentication response.

Figure 1:
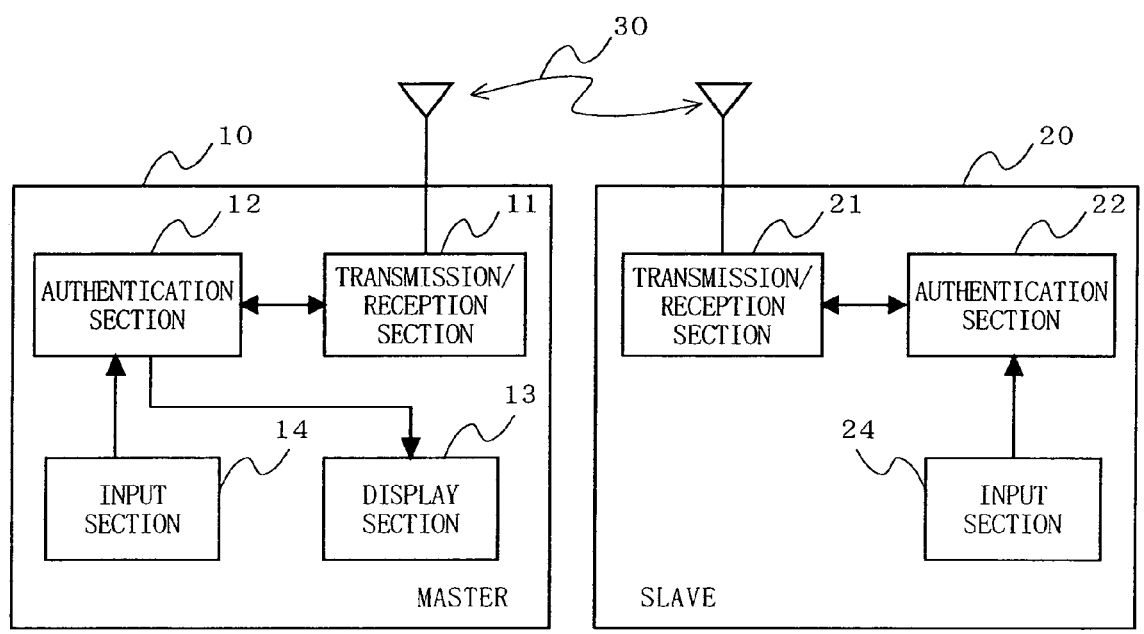
FIG. 1 shows a general structure of a wireless LAN system according to a first embodiment of the present invention.

DESCRIPTION OF THE REFERENCE CHARACTERS 10, 40 Master (AP)
11, 21 Transmission/reception section
12, 22 Authentication section
13, 23 Display section
14, 24 Input section
20, 50 Slave (client)
30 Wireless LAN
90 Illegal party device
111 Public key/secret key generation section
112 Electronic signature section
113 Encryption section
114 Decryption section
115 Pseudo random number generation section
116 Hash function section
117 Common encryption key generation section

BEST MODE FOR CARRYING OUT THE INVENTION

The present invention provides a communication device connected to various network systems regardless of whether the network system is for a wireless or wired communication, or for a short distance or long distance communication, and is especially characterized in authentication processing performed between communication devices. Hereinafter, the present invention will be described using an exemplary wireless LAN system including a master (or an access point) and a slave (or a client).

First Embodiment

FIG. 1 shows a general structure of a wireless LAN system according to a first embodiment of the present invention. In the wireless LAN system shown in FIG. 1, a master 10 and a slave 20 are connected to each other by a wireless LAN 30. The master 10 includes a transmission/reception section 11, an authentication section 12, a display section 13, and an input section 14. The slave 20 includes a transmission/reception section 21, an authentication section 22, and an input section 24.

The transmission/reception section 11 receives an authentication message from the authentication section 12, adds information necessary for the slave 20 to receive the authentication message, such as an address of the slave 20, an address of the master 10 and the like as a header, and then transmits the authentication message via the wireless LAN 30. The transmission/reception section 11 receives a message transmitted from the slave 20 after determining whether or not the message is addressed to the master 10 using header information, and retrieves and transfers the authentication message to the authentication section 12. Wireless channel information (for example, a channel number) used in the communication by the wireless LAN 30 for each of transmission and reception is notified to the authentication section 12. Similarly, the transmission/reception section 21 receives an authentication message from the authentication section 22, adds information necessary for the master 10 to receive the authentication message, such as the address the master 10, the address of the slave 20 and the like as a header, and then transmits the authentication message via the wireless LAN 30. The transmission/reception section 21 receives a message transmitted from the master 10 after determining whether or not the message is addressed to the slave 20 using header information, and retrieves and transfers the authentication message to the authentication section 22. Wireless channel information used for each of transmission and reception is notified to the authentication section 22.

The authentication sections 12 and 22 play a role of performing overall control at the time of connection with another communication device. The authentication sections 12 and 22 also assemble and disassemble a message such as an authentication request or the like. The authentication sections 12 and 22 further monitor if a man-in-the-middle device changes and forwards an authentication request message. The authentication section 12 also controls channel information display, public key display and the like. The authentication sections 12 and 22 may be mounted on a MAC (media access control) layer or a layer upper to the MAC layer of the wireless LAN. When the authentication sections 12 and 22 are mounted on the MAC layer, the authentication request message or the like uses a format similar to the format of a frame of the MAC layer. By contrast, when the authentication sections 12 and 22 are mounted on a layer upper to the MAC layer, the authentication request message or the like uses a different format from the format of a frame of a MAC layer and is transmitted in the state of being encapsulated in a MAC frame.

The display section 13 displays device information included in the authentication request received from the slave 20 on a screen thereof. The device information is, for example, an identification number (ID) including a product number, a MAC address or the like, a public key, an electronic signature or the like. The device information is displayed for the user to determine whether or not to verify the authentication. The display section 13 is a display device such as a liquid crystal display or the like.

The input section 14 is provided for the user to input data and commands to the master 10 and also to input the determination result on whether or not to verify the authentication based on the display by the display section 13. The input section 24 is provided for the user to input data and commands to the master 10. The input sections 14 and 24 each include, for example, a push button.

In the wireless LAN system in the first embodiment, only the master 10 includes the display section 13. For example, the slave 20 may be a network camera with no display section, and the master 10 may be a network camera controller with the display section 13. Hereinafter, an authentication procedure performed by the wireless LAN system in the first embodiment will be described. When the authentication sections 12 and 22 are mounted on a MAC layer, the messages exchanged between the master 10 and the slave 20 may be in a known format of, for example, the MAC layer standard of IEEE Standard 802.11.

Hereinafter, with reference to FIG. 2 through FIG. 8, an authentication procedure performed between the master 10 and the slave 20 in the first embodiment will be described regarding various cases.

Figure 2:
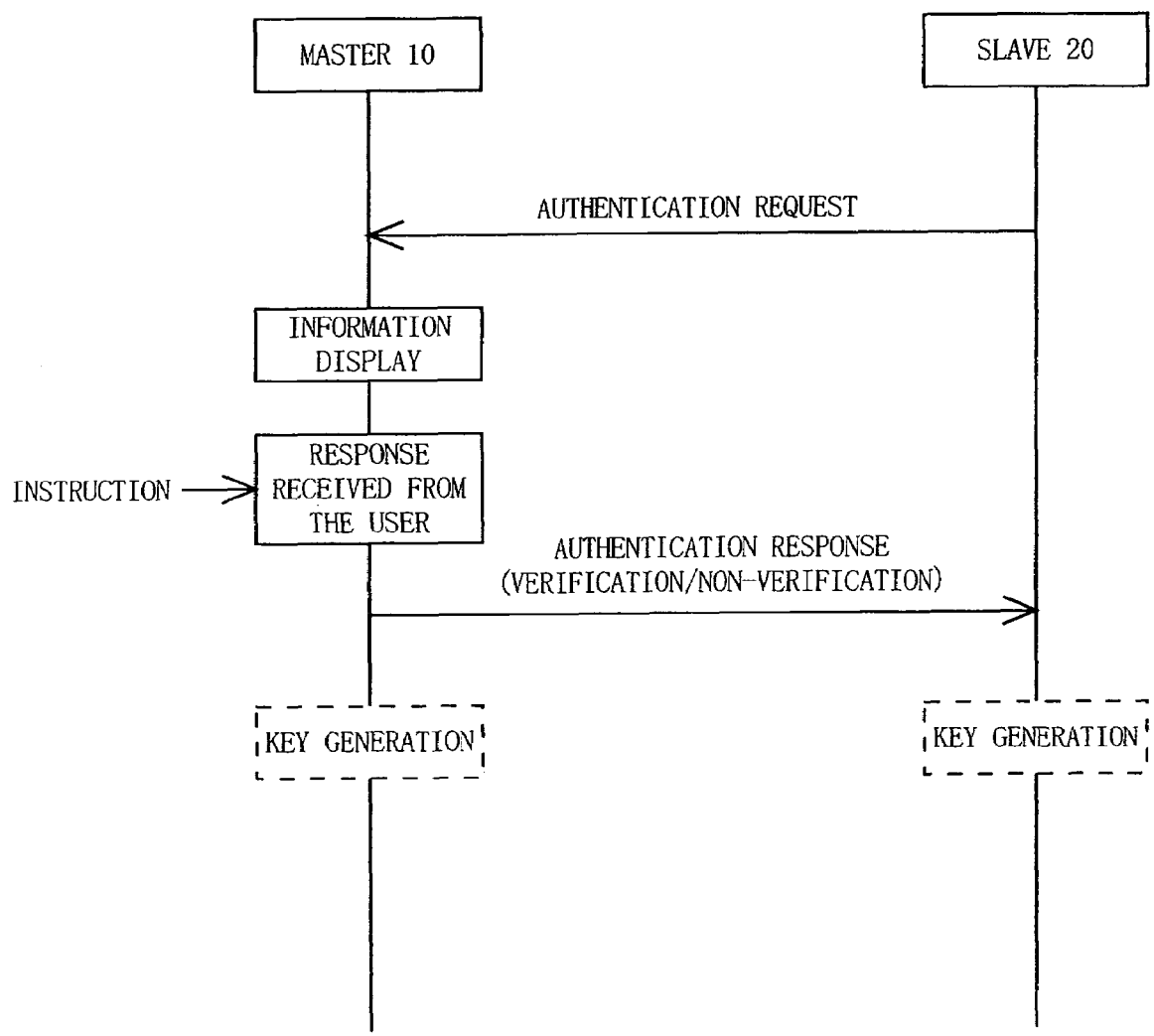
FIG. 2 is a sequence diagram showing a basic authentication procedure performed between two parties.
Figure 3:
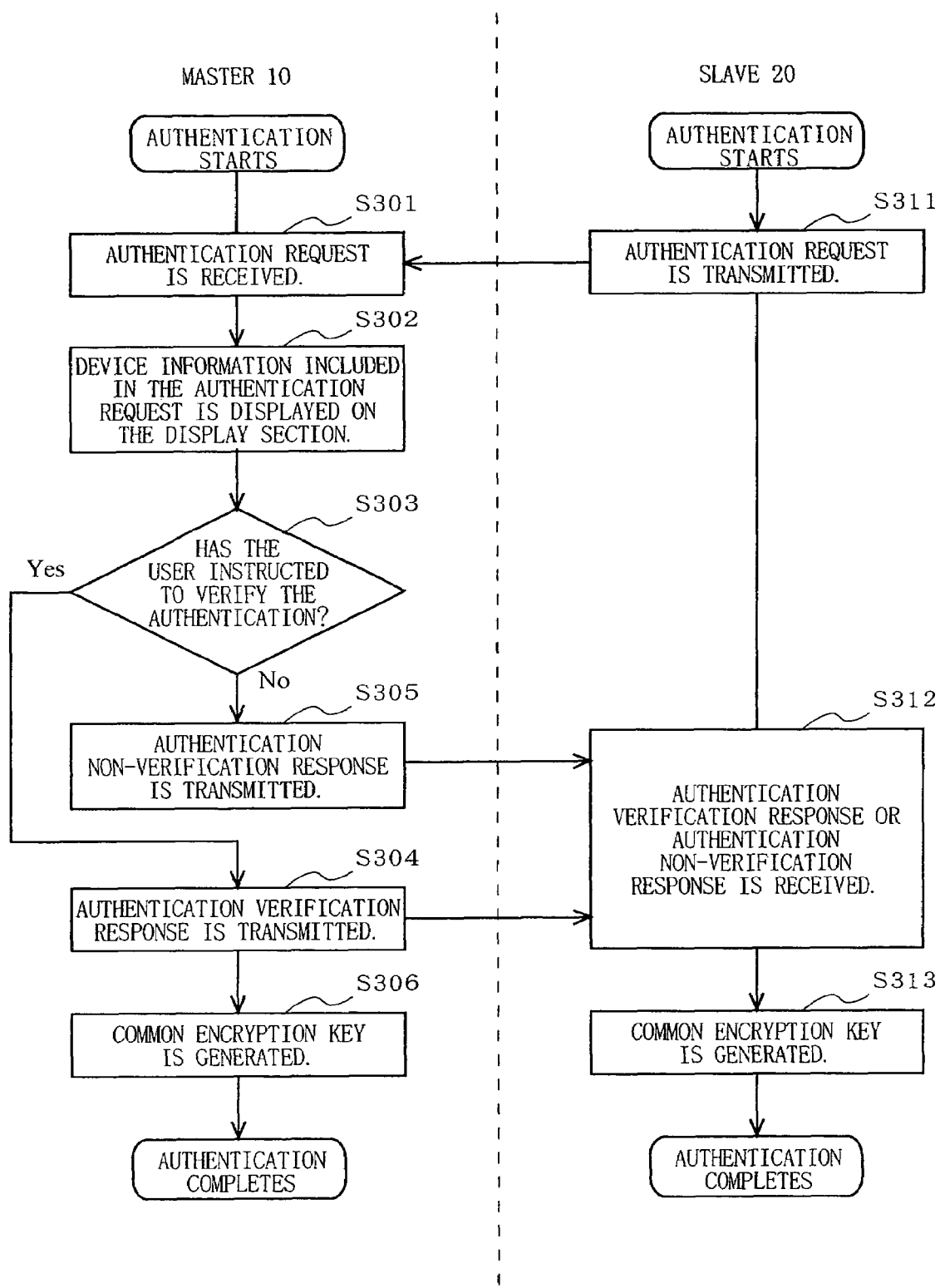
FIG. 3 is a flowchart showing processing of an authentication method according to the first embodiment of the present invention.

(1) Basic Authentication Procedure Performed Between Two Parties (FIG. 2)

Figure 5A:
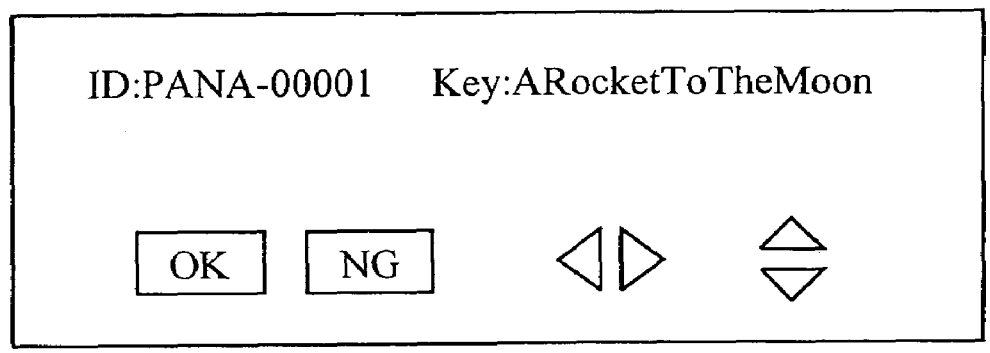
FIG. 5A shows an example of a display screen of a display section 13.
Figure 5B:
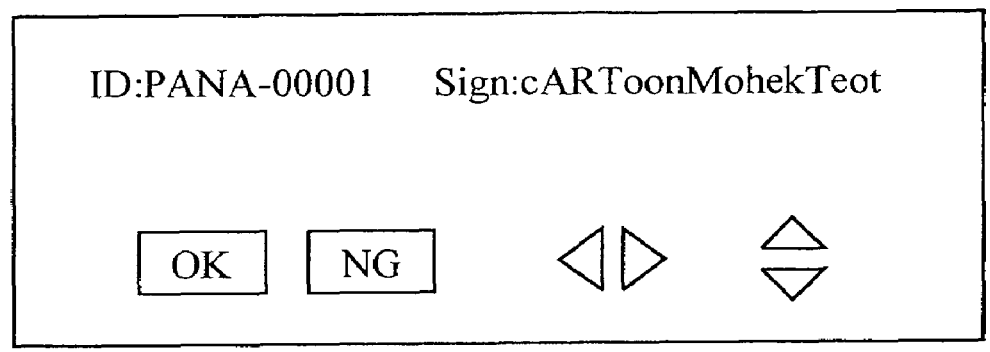
FIG. 5B shows an example of a display screen of the display section 13.

For performing authentication with the master 10, the slave 20 transmits an authentication request including an ID and a public key (or an electronic signature) as device information to the master 10 (step S311). FIG. 4A shows an example of the authentication request. The master 10 receives the authentication request (step S301), and displays the device information included in the authentication request on a screen of the display 13 (step S302). FIG. 5A and FIG. 5B each show an example of the screen of the display section 13 displaying device information. The user visually checks the device information displayed on the screen of the display section 13, determines whether or not to verify the authentication, and instructs the master 10 of the determination result via the input section 14 (step S303). This instruction is typically performed by pushing a push button. The master 10, instructed to verify or not to verify the authentication, transmits a response in accordance with the instruction to the slave 20 (steps S304 and S305).

In order to determine whether or not to verify the authentication, the user needs to obtain the device information of the slave 20 beforehand. The device information of the slave 20 may be directly obtained by the user who is to check the display section 13 of the master 10 (for example, from the internal memory data or product specifications of the slave 20) or may be notified by another user who manages the slave 20 (for example, by a phone call or a memo). The time to obtain the device information may be when or before the device information is displayed on the display section 13 of the master 10.

When the device information displayed on the screen of the display section 13 is determined to be correct by the user and the user instructs to verify the authentication, the master 10 creates an authentication verification response including its own ID and a random number encrypted by the public key of the slave 20, and transmits the authentication verification response to the slave 20 (step S304). FIG. 4B shows an example of the authentication response. The authentication verification response is received by the slave 20 (step S312). Then, the master 10 and the slave 20 each generate a common encryption key for communication based on the public key (PubKey) of the slave 20, the ID of the master 10 (IDm), the ID of the slave 20 (IDs) and the random number (N) (steps S306 and S313). The common encryption key for communication is generated by, for example, the following expression. In the expression, prf( ) is a pseudo random function, and PreMasterKey is a preset common value.

Common encryption key=$prf$(PreMasterKey, PubKey$\|$IDm$\|$IDs$\|$N)

By contrast, when the device information displayed on the screen of the display section 13 is determined to be incorrect by the user and the user instructs not to verify the authentication, the master 10 creates and transmits an authentication non-verification response to the slave 20 (step S305). It may be set that unless the master 10 responds within a predetermined time period after the slave 20 transmits an authentication request, it is determined that the authentication is not verified. In this case, the master 10 does not need to transmit an authentication non-verification response to the slave 20.

Figure 6:
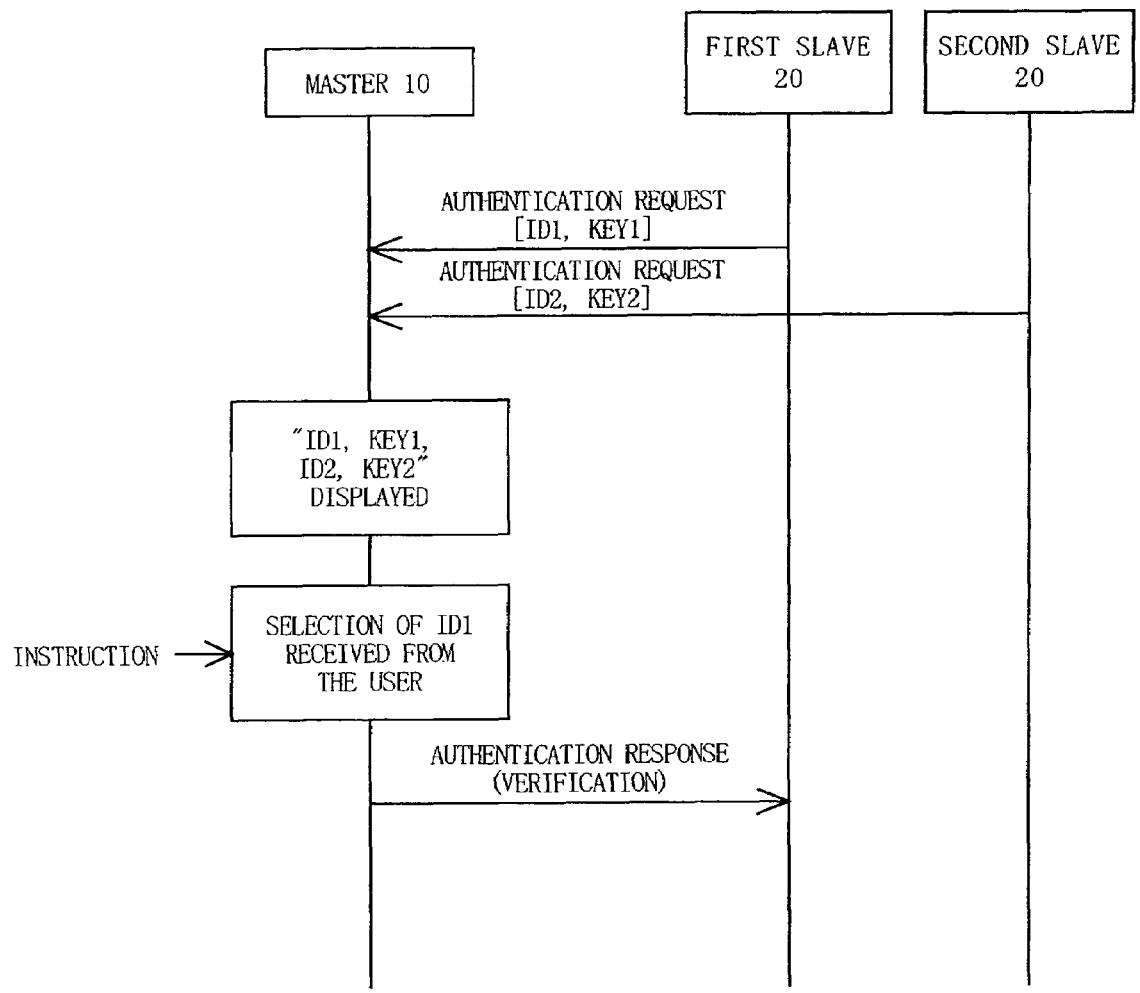
FIG. 6 is a sequence diagram showing an authentication procedure performed between three parties.

(2) Authentication Procedure Performed Among Three Parties (FIG. 6)

Figure 7:
FIG. 7 shows an example of a display screen of the display section 13.
Figure 7:

In this procedure, a first slave 20 transmits an authentication request including device information [ID1, key1] to the master 10, and simultaneously a second slave 20 transmits an authentication request including device information [ID2, key2] to the master 10. In this case, the master 10 receives the two authentication requests and displays two pieces of device information on the screen of the display section 13. FIG. 7 is an example of the screen displaying the device information. The user visually checks the two pieces of device information displayed on the screen of the display section 13, determines whether or not to verify the authentication, and instructs the master 10 of the determination result via the input section 14. Since the user knows the device information of the slave 20 which is to be authenticated, the user selects the slave 20 which transmitted such device information and verifies the authentication of that slave 20. When neither device information displayed on the screen of the display section 13 matches the known device information, the user determines not to verify the authentication.

The above-described authentication procedure is applicable to the case where the authentication is performed among four or more parties. Substantially the same procedure is usable in the case where an electronic signature is used for the device information instead of the key.

Figure 8:
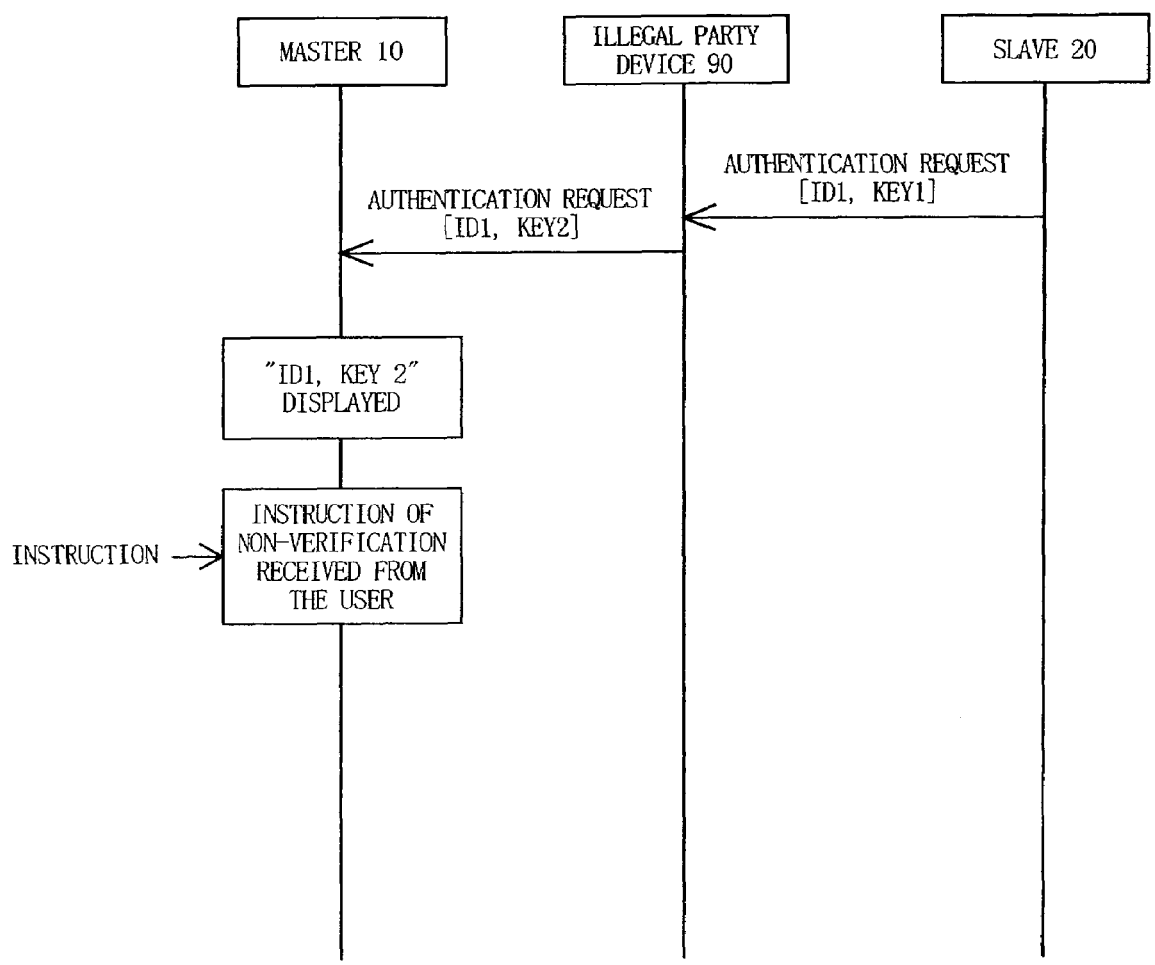
FIG. 8 is a sequence diagram showing an authentication procedure performed when an illegal party exists between two parties.

(3) Authentication Procedure when an Illegal Party Exists Between Two Parties (FIG. 8)

The slave 20 transmits an authentication request including device information [ID1, key1] to the master 10. However, the authentication request does not reach the master 10 and is received by an illegal party device 90. The illegal party device 90 transmits, to the master 10, an authentication request including pseudo device information [ID1, key2], which replaces the device information [ID1, key1] in order to disguise the illegal party device 90 as the slave. The master 10 receives the authentication request and displays the device information included in the authentication request on the screen of the display section 13. The user visually checks the device information displayed on the screen of the display section 13 and determines that the public key information of the displayed device information does not match that of the device information of the slave 20 to be authenticated. Namely, the user recognizes that the displayed device information [ID1, key2] is different from [ID1, key1], which is of the device information of the slave 20 already obtained. In accordance with the determination, the user transmits an authentication non-verification response to the device which transmitted the authentication request. Substantially the same procedure is usable in the case where an electronic signature is used for the device information instead of the key.

As described above, the communication device according to the first embodiment of the present invention displays the device information of the slave which transmitted the authentication request on the master side. This allows the user to easily determine whether or not the communication device which transmitted the authentication request is a slave to be authenticated. Thus, the safety and certainty of the authentication processing can be improved.

In the case where a common encryption key is generated using the device information (ID) confirmed on the screen, the secrecy in the actual communication can be further improved.

Second Embodiment

Figure 9:
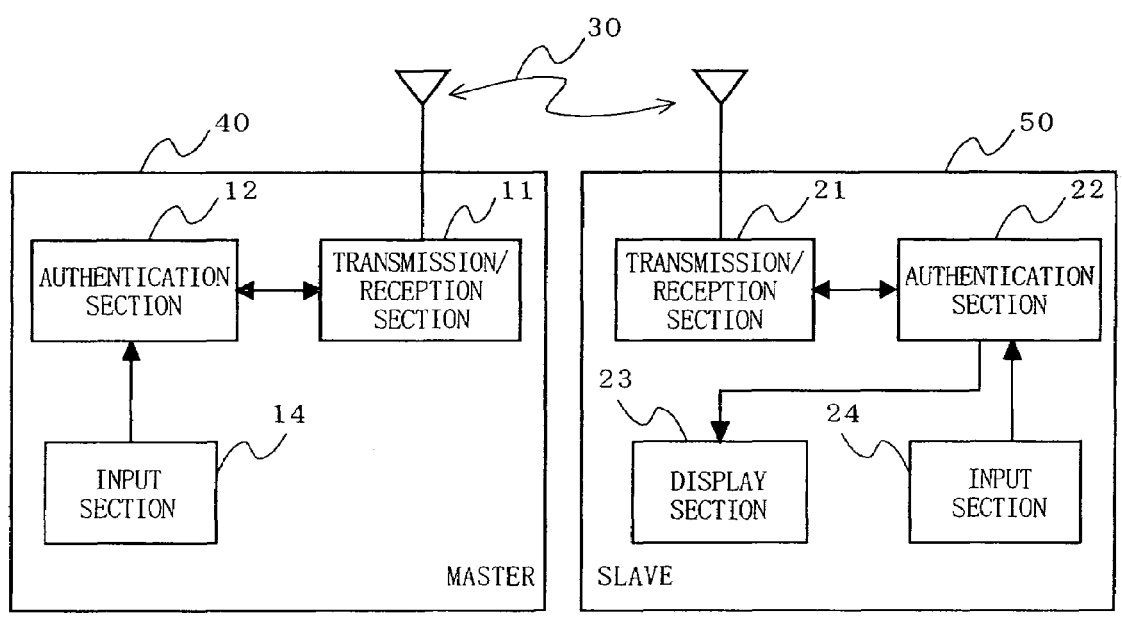
FIG. 9 shows a general structure of a wireless LAN system according to a second embodiment of the present invention.

FIG. 9 shows a general structure of a wireless LAN system according to a second embodiment of the present invention. In the wireless LAN system shown in FIG. 9, a master 40 and a slave 50 are connected to each other by a wireless LAN 30. The master 40 includes a transmission/reception section 11, an authentication section 12, and an input section 14. The slave 50 includes a transmission/reception section 21, an authentication section 22, a display section 23, and an input section 24. As can be appreciated from FIG. 9, in the wireless LAN system according to the second embodiment, the slave 50 includes the display section 23, not the master 40.

Hereinafter, the second embodiment will be described mainly regarding the difference in the structure.

The display section 23 displays device information included in the authentication request received from the master 40 on a screen thereof. The device information is displayed for the user to determine whether or not to verify the authentication. The display section 23 is a display device such as a liquid crystal display or the like. The input section 24 is provided for the user to input data and commands to the slave 50 and also to input the determination result on whether or not to verify the authentication based on the display by the display section 23.

In the wireless LAN system in the second embodiment, only the slave 50 includes the display section 23. For example, the slave 50 may be a WiFi handset with the display section 23, and the master 40 may be a WiFi telephone base with no display section. Hereinafter, an authentication procedure performed by the wireless LAN system in the second embodiment will be described. When the authentication sections 12 and 22 are mounted on a MAC layer, the messages exchanged between the master 40 and the slave 50 may be in a known format of, for example, the MAC layer standard of IEEE Standard 802.11.

Hereinafter, with reference to FIG. 10 through FIG. 14, an authentication procedure performed between the master 40 and the slave 50 in the second embodiment will be described regarding various cases.

Figure 10:
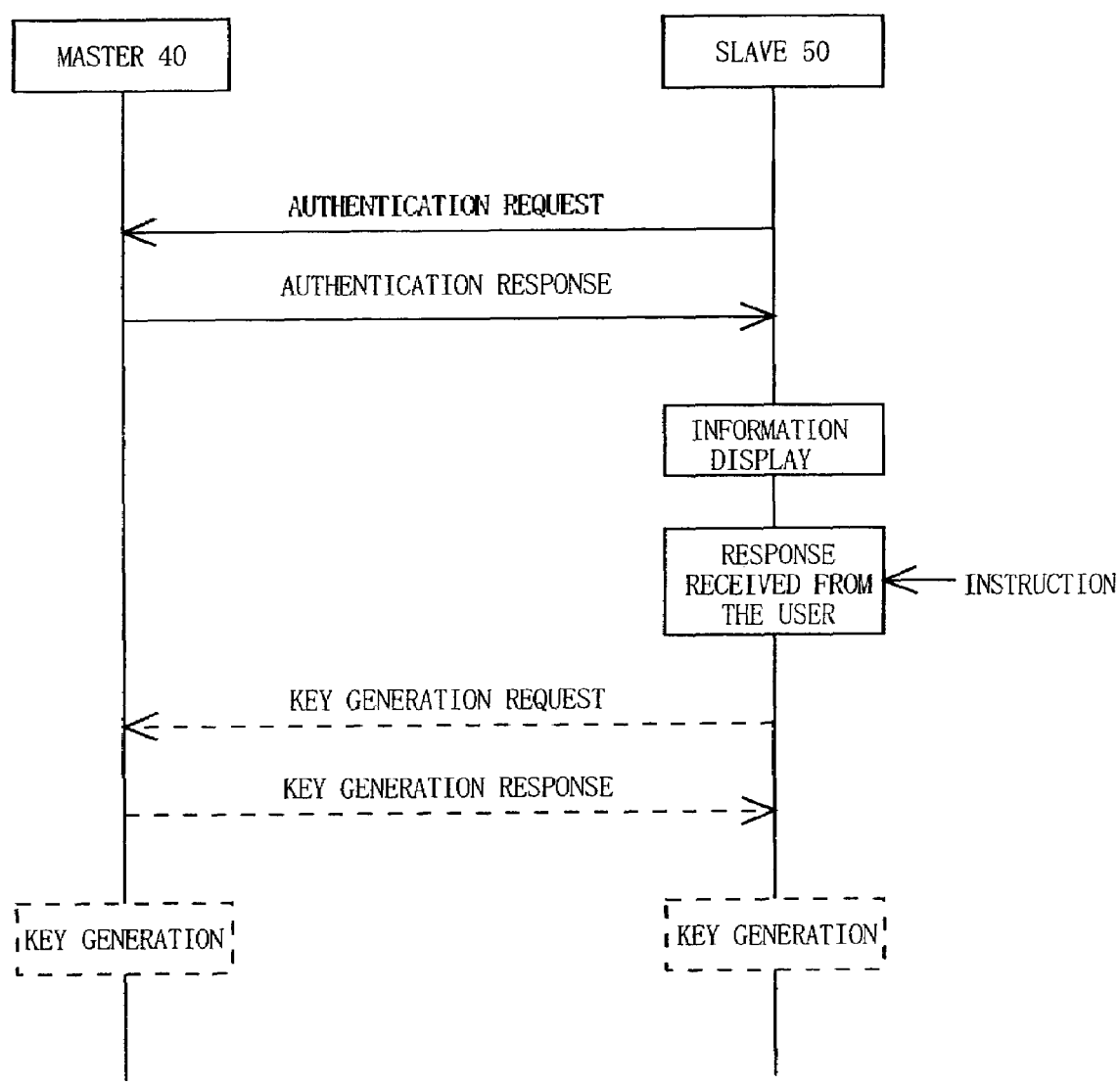
FIG. 10 is a sequence diagram showing a basic authentication procedure performed between two parties.
Figure 11:
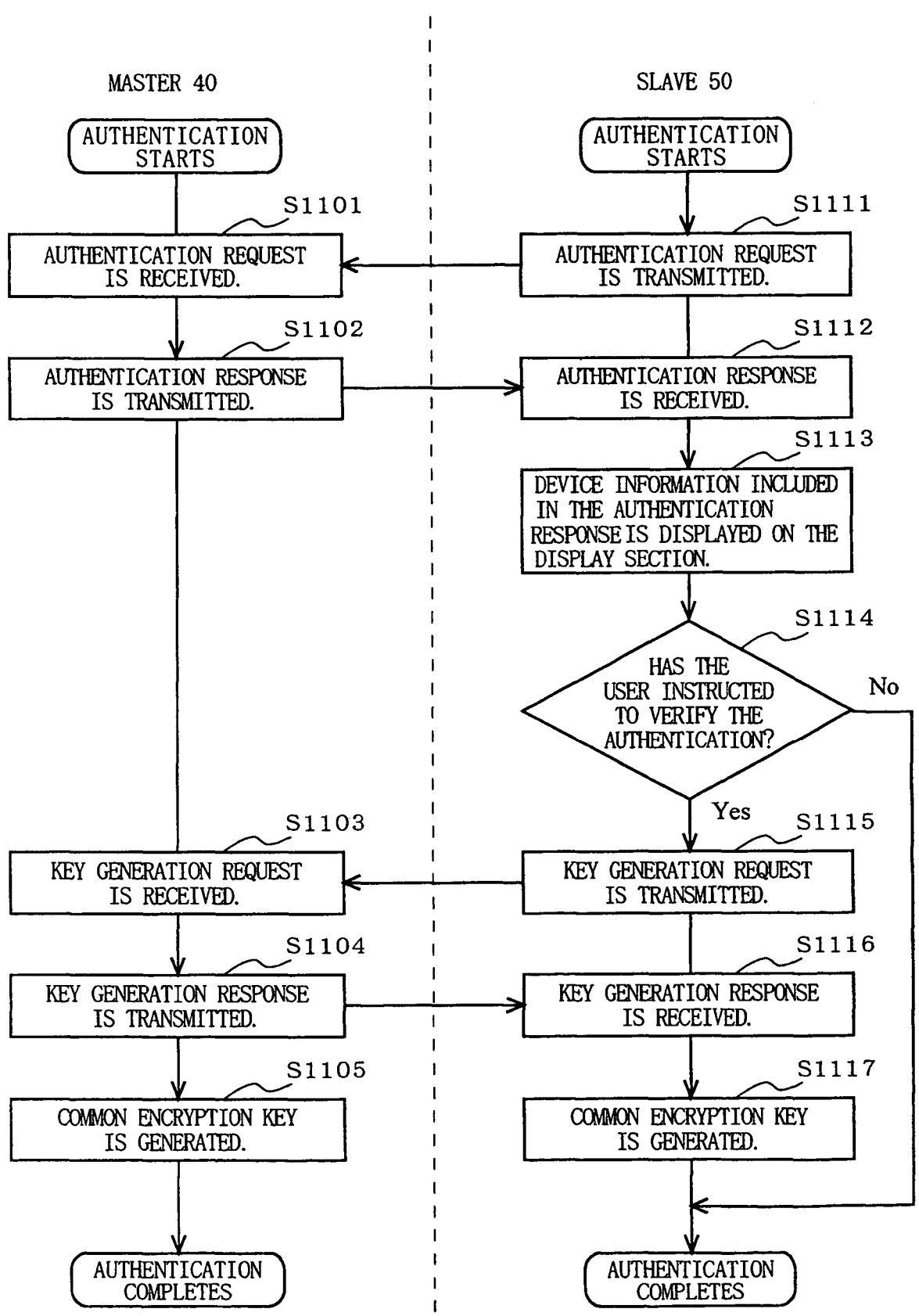
FIG. 11 is a flowchart showing processing of an authentication method according to the second embodiment of the present invention.

(1) Basic Authentication Procedure Performed Between Two Parties (FIG. 10)

Figure 12A:
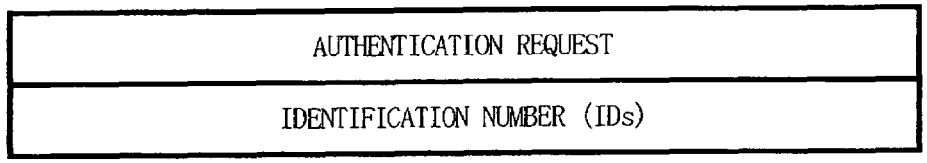
FIG. 12A shows an example of an authentication request.
Figure 12B:
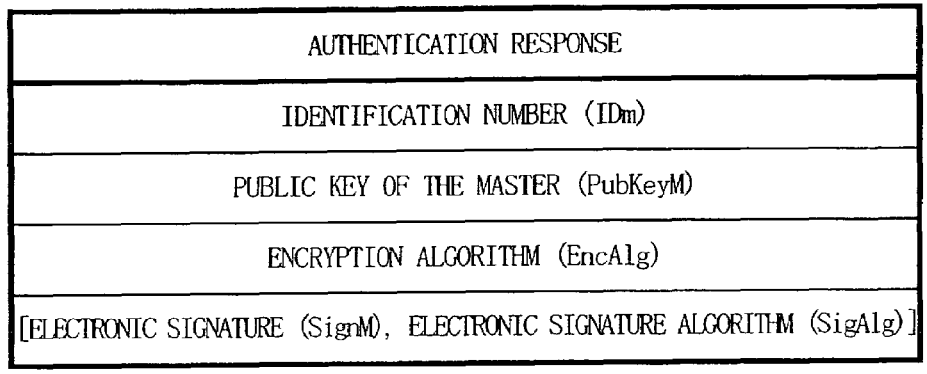
FIG. 12B shows an example of an authentication response.

For performing authentication with the master 40, the slave 50 transmits an authentication request to the master 40 (step S1111). FIG. 12A shows an example of the authentication request. The master 40 receives the authentication request (step S1101), and transmits an authentication response which includes device information including its own ID and public key (or electronic signature) to the slave 50 (step S1102). FIG. 12B shows an example of the authentication response. The slave 50 receives the authentication response (step S1112), and displays the device information included in the authentication response on the screen of the display section 23 (step S1113). The display screen of the display section 23 is as the examples shown in FIG. 5A and FIG. 5B. The user visually checks the device information displayed on the screen of the display section 23, determines whether or not to verify the authentication, and instructs the slave 50 of the determination result via the input section 24 (step S1114). This instruction is typically performed by pushing a push button. The slave 50, instructed to verify or not to verify the authentication, performs the processing in accordance with the instruction.

In order to determine whether or not to verify the authentication, the user needs to obtain the device information of the master 40 beforehand. The device information of the master 40 may be directly obtained by the user who is to check the display section 23 of the slave 50 or may be notified by another user who administers the master 40. The time to obtain the device information may be when or before the device information is displayed on the display section 23 of the slave 50.

Figure 12C:
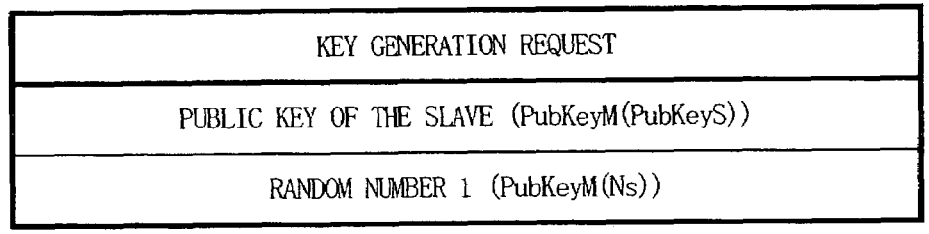
FIG. 12C shows an example of a key generation request.
Figure 12D:
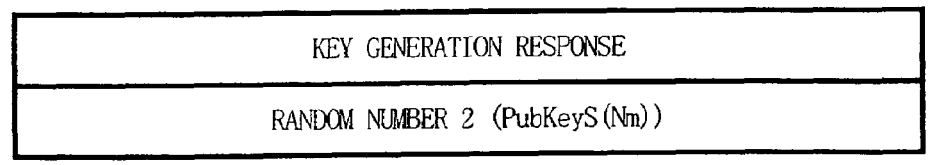
FIG. 12D shows an example of a key generation response.

When the device information displayed on the screen of the display section 23 is determined to be correct by the user and the user instructs to verify the authentication, the slave 50 creates a key generation request including its own ID and a random number encrypted by the public key of the master 40, and transmits the key generation request to the master 40 (step S1115) FIG. 12C shows an example of the key generation request. Upon receiving the key generation request (step S1103), the master 40 transmits a key generation response including a random number encrypted by the public key of the slave 50 to the slave 50 (step S1104). FIG. 12D shows an example of the key generation response. The key generation response is received by the slave 50 (step S1116). Then, the master 40 and the slave 50 each generate a common encryption key for communication based on the public key of the master 40 (PubKeyM), the public key of the slave 50 (PubKeyS), the ID of the master 40 (IDm), the ID of the slave 50 (IDs), the random number generated by the slave 50 (Ns) and the random number generated by the master 40 (Nm) (steps S1105 and S1117). The common encryption key for communication is generated by, for example, the following expression.

Common encryption key=$prf$(PreMasterKey, PubKeyS∥PubKeyM∥IDm∥IDs∥Ns∥Nm)

By contrast, when the device information displayed on the screen of the display section 23 is determined to be incorrect by the user and the user instructs not to verify the authentication, the slave 50 terminates the authentication process. It may be set that unless the user does not input any instruction within a predetermined time period after the slave 50 displays the device information on the display section 23, it is determined that the authentication is not verified.

Figure 13:
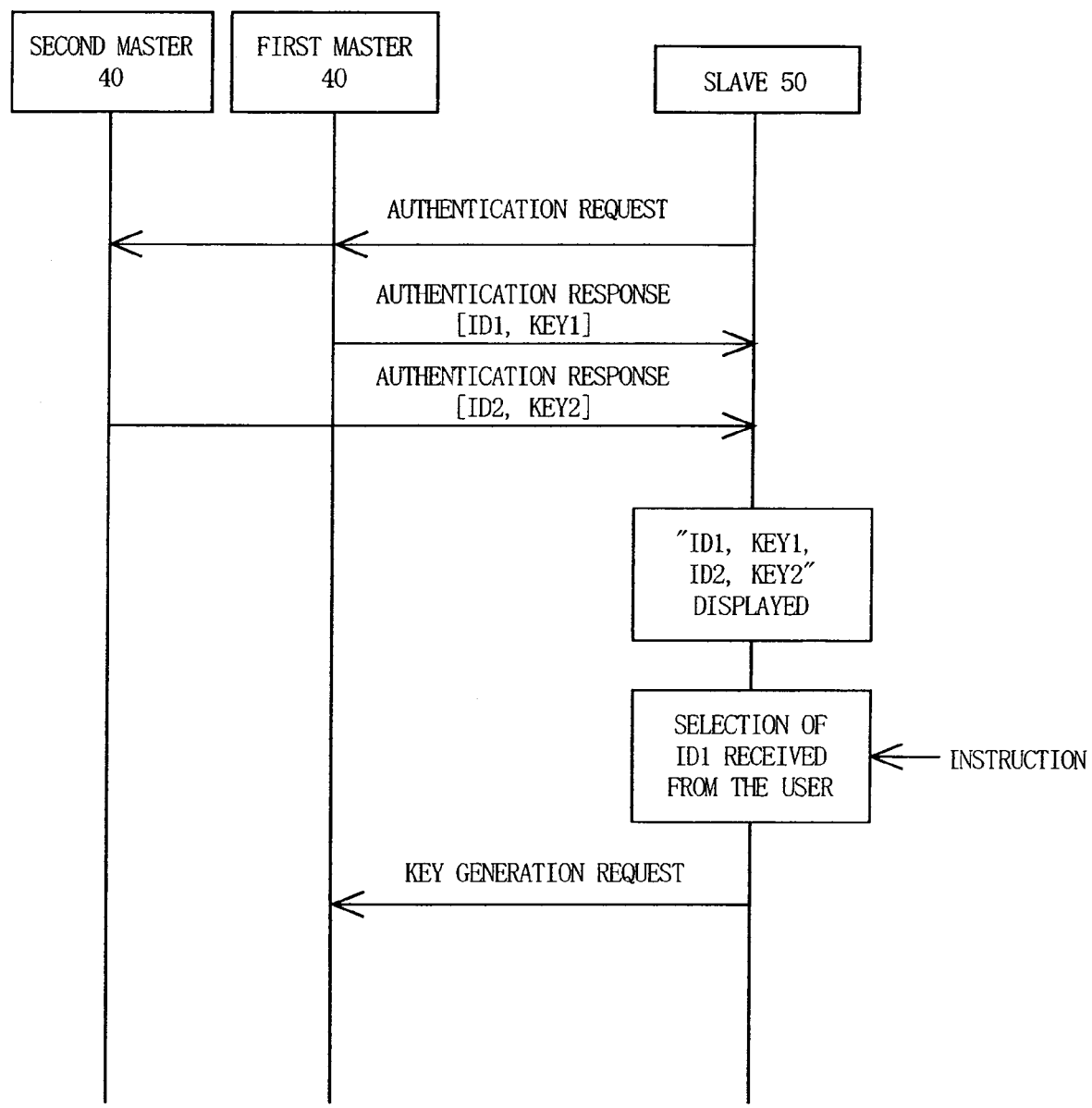
FIG. 13 is a sequence diagram showing an authentication procedure performed between three parties.

(2) Authentication Procedure Performed Among Three Parties (FIG. 13)

In this procedure, an authentication request transmitted from the slave 50 is received by a first master 40 and a second master 40. In this case, the slave 50 receives an authentication response from each of the first master 40 and the second master 40 and displays the two pieces of device information on the screen of the display section 23. The display screen of the display section 23 is as the example shown in FIG. 7. The user visually checks the two pieces of device information displayed on the screen of the display section 23, determines whether or not to verify the authentication, and instructs the slave 50 of the determination result via the input section 24. Since the user knows the device information of the master 40 which is to be authenticated, the user selects the master 40 which transmitted such device information and verifies the authentication of that master 40. When neither device information displayed on the screen of the display section 23 matches the known device information, the user determines not to verify the authentication.

The above-described authentication procedure is applicable to the case where the authentication is performed among four or more parties. Substantially the same procedure is usable in the case where an electronic signature is used for the device information instead of the key.

Figure 14:
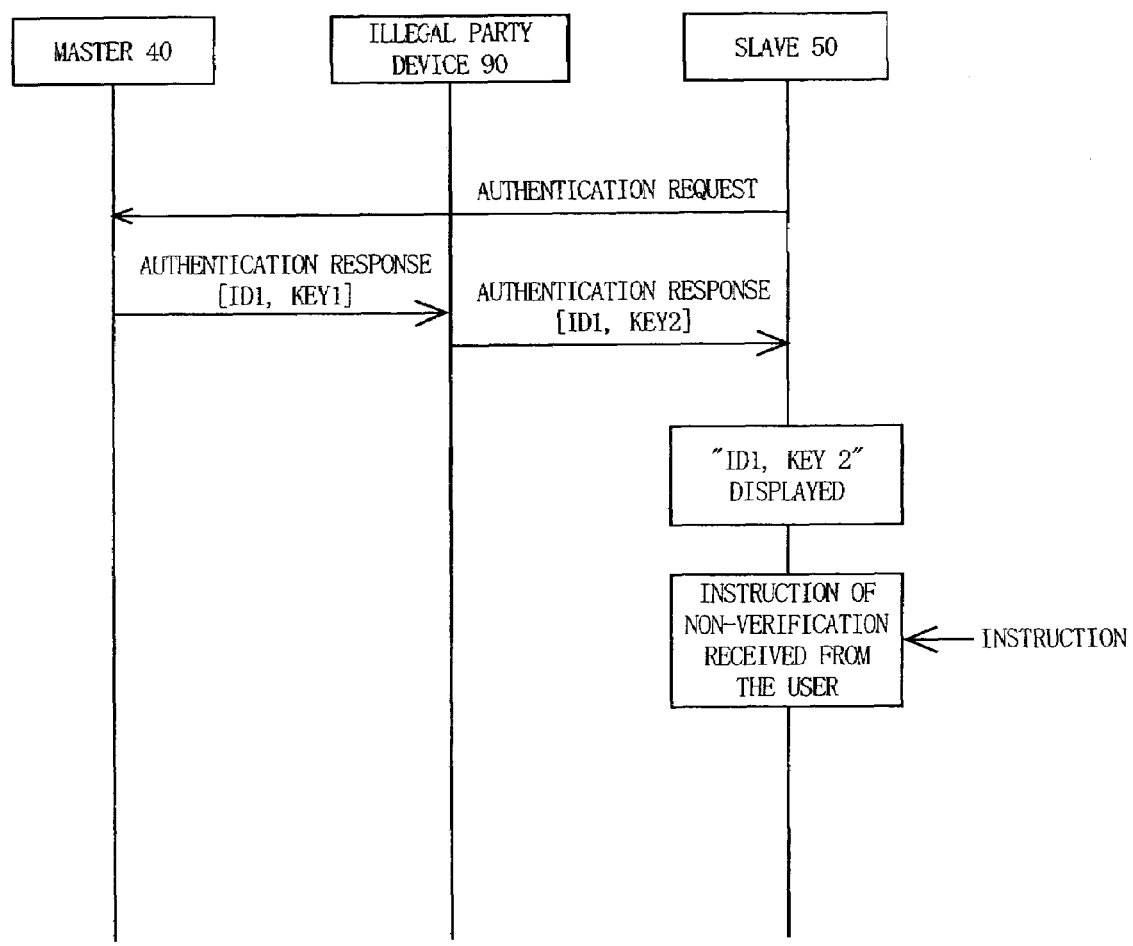
FIG. 14 is a sequence diagram showing an authentication procedure performed when an illegal party exists between two parties.

(3) Authentication Procedure when an Illegal Party Exists Between Two Parties (FIG. 14)

The slave 50 transmits an authentication request to the master 40. In response to the authentication request, the master 40 transmits an authentication response including device information [ID1, key1] to the slave 40. However, the authentication response does not reach the slave 50 and is received by an illegal party device 90. The illegal party device 90 transmits, to the slave 50, an authentication response including pseudo device information [ID1, key2], which replaces the device information [ID1, key1] in order to disguise the illegal party device 90 as the master. The slave 50 receives the authentication response and displays the device information included in the authentication response on the screen of the display section 23. The user visually checks the device information displayed on the screen of the display section 23 and determines that the public key information of the displayed device information does not match that of the device information of the master 40 to be authenticated. Namely, the user recognizes that the displayed device information [ID1, key2] is different from [ID1, key1], which is of the device information of the master 40 already obtained. In accordance with the determination, the user terminates the authentication process. Substantially the same procedure is usable in the case where an electronic signature is used for the device information instead of the key.

As described above, the communication device according to the second embodiment of the present invention displays the device information of the master which transmitted the authentication response on the slave side. This allows the user to easily determine whether or not the communication device which transmitted the authentication response is a master to be authenticated. Thus, the safety and certainty of the authentication processing can be improved.

In the case where a common encryption key is generated using the device information (ID) confirmed on the screen, the secrecy in the actual communication can be further improved.

Third Embodiment

Figure 15:
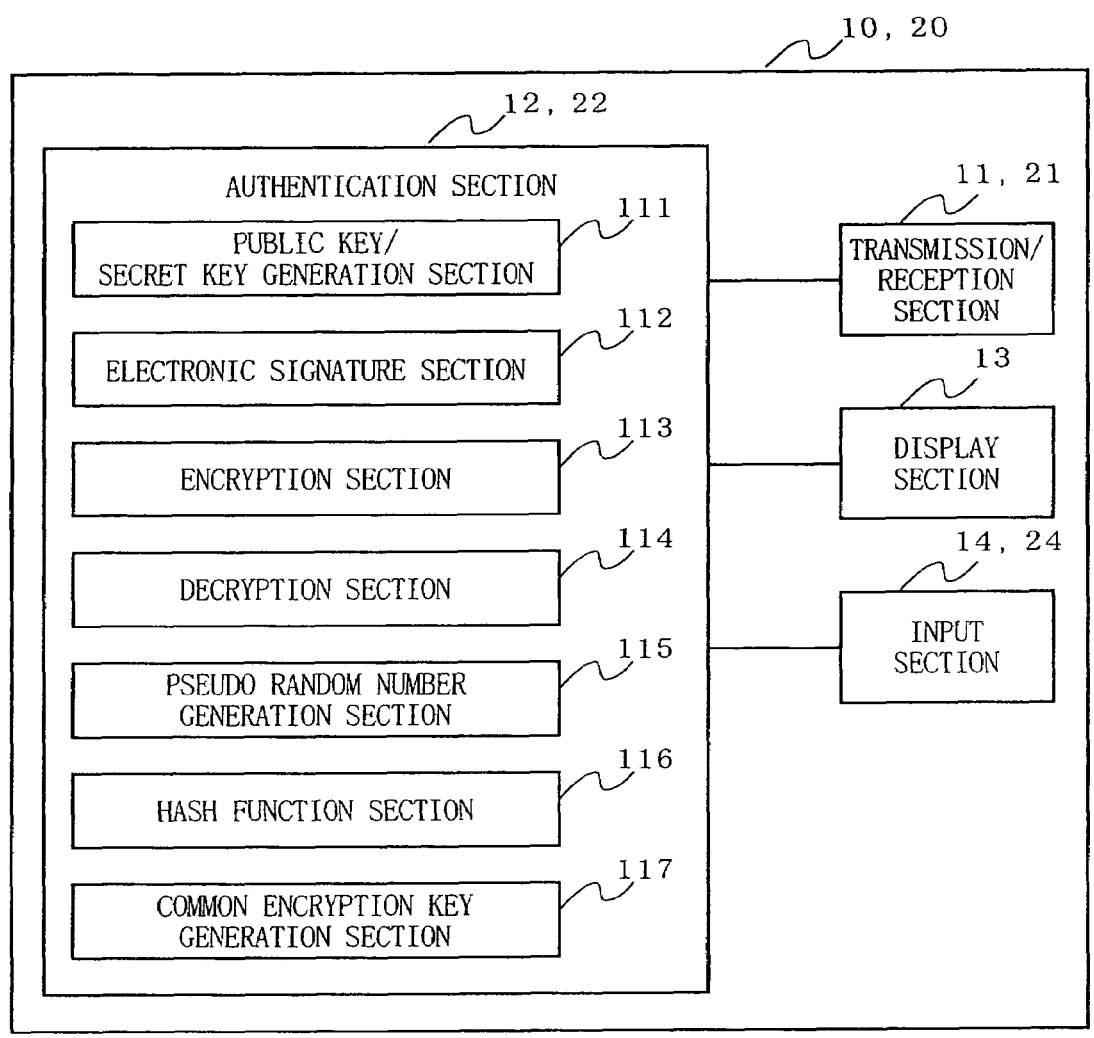
FIG. 15 shows an exemplary detailed structure of authentication sections 12 and 22.

Next, specific examples of the structure of, and the authentication processing performed by, the master 10 and the slave 20 described in the first embodiment will be described. In the third embodiment, the master will be described as an AP and the slave will be described as a client. FIG. 15 shows an exemplary detailed structure of the authentication sections 12 and 22. In FIG. 15, the authentication sections 12 and 22 each include a public key/secret key generation section 111, an electronic signature section 112, an encryption section 113, a decryption section 114, a pseudo random number generation section 115, a Hash function section 116, and a common encryption key generation section 117. Needless to say, the exemplary specific structures and authentication procedures described below are also applicable to the master 40 and the slave 50 described in the second embodiment.

The public key/secret key generation section 111 generates its own public key/secret key pair. The generation is performed when the device is started or when regeneration of its own public key/secret key pair is necessary after the device is started. A public key is to be published, and a secret key is not to be published. The electronic signature section 112 shortens a message to a fixed length using the Hash function section 116, encrypts the message by the secret key and an algorithm of the encryption section 113, and adds the encryption result to the message as an electronic signature. The encryption section 113 includes an algorithm for encrypting a message using the public key of another communication device with which communication is to be made, its own secret key, or a common encryption key shared with the another communication device. The decryption section 114 includes an algorithm for decrypting a message using its own secret key, the public key of the another communication device (in the case of an electronic signature), or a common encryption key shared with the another communication device. The pseudo random number generation section 115 has a function of generating pseudo random numbers, the regularity of which is difficult to predict, and generates a nonce or an ID (when necessary). The ID is actually a random number generated by the pseudo random number generation section 115 but is described as an "ID" because the ID has the same role as that of an identification number including a product number or a MAC address described in the first embodiment (see the fourth specific example in this embodiment). The Hash function section 116 includes a one-direction Hash function for compressing a long bit string to a fixed length bit string. The common encryption key generation section 117 generates a common encryption key based on two nonces (random numbers) using the pseudo random number generation section 115.

The public key/secret key generation section 111, the electronic signature section 112, the encryption section 113, the decryption section 114, the pseudo random number generation section 115, the Hash function section 116, and the common encryption key generation section 117 may be mounted as internal modules of each of the authentication sections 12 and 22 as shown in FIG. 15, may be provided outside each of the authentication sections 12 and 22, or may be mounted so as to be used by calling an usable external common module.

Hereinafter, with reference to FIG. 16 through FIG. 24, procedures for authentication and key generation for connecting a client to an AP according to the third embodiment will be described.

First Specific Example

Figure 17:
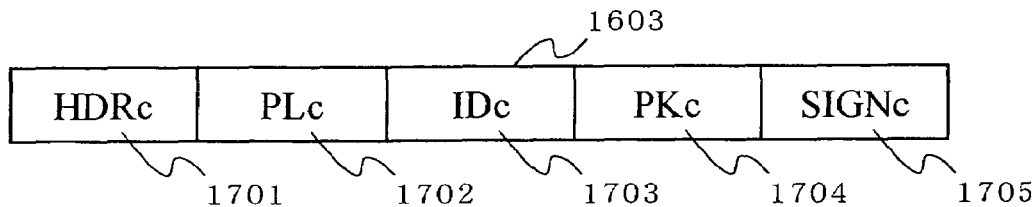
FIG. 17 shows an example of a format of an authentication request message.

A probe request 1600 and a probe response 1601 adopt a conventional standard format represented by IEEE Standard 802.11. A probe confirmation 1602 is not included in the conventional standard and is a new type of message having functions of carrying out a connection system according to the present invention and notifying a parameter required for the connection system. Messages of an authentication request 1603 and thereafter all adopt a new format defined by the present invention. An example of the format of the authentication request 1603 is shown in FIG. 17. A HDRc 1701 is a header including an address and a message type of the client 20, and is substantially the same as a header of the conventional authentication request. A PLc 1702 is a payload substantially the same as that of the conventional authentication request. A PKc 1704 is a public key of the client 20. An IDc 1703 is an ID of the client 20. A SIGNc 1705 is a signature made for all the fields including the header using the electronic signature section 112 of the client 20. The transmission/reception section 21 of the client 20 obtains the public key PKc 1704 of the client 20 from the public key/secret key generation section 111. The transmission/reception section 21 also obtains the SIGNc 1705 from the electronic signature section 112, and assembles the SIGNc 1705 with the IDc 1703 owned by the authentication section 22 to generate the authentication request 1603. The authentication request 1603 allows the public key PKc 1704 of the client 20 to be transferred to the AP 10.

When the AP 10 receives the authentication request 1603, the transmission/reception section 11 of the AP 10 retrieves the public key PKc 1704 and the electronic signature SIGNc 1705 of the client 20 included in the authentication request 1603, and transfers the public key PKc 1704 and the electronic signature SIGNc 1705 to the authentication section 12 of the AP 10. The authentication section 12 compares the result of decrypting the SIGNc 1705 using the public key PKc 1704 of the client 20 and the decryption section 114 of the AP 10, with the result of multiplying the received authentication request 1603 by its own Hash function, which is the same as the Hash function used for the signature for the client 20, in the Hash function section 116 of the AP 10 (namely, the authentication section 12 checks the integrity). When the two results match each other, the authentication section 12 displays, on the display section 13 of the AP 10, the ID included in the received authentication request 1603, i.e., the IDc, and the wireless channel information used for the reception by the transmission/reception section 11 of the AP 10. The user checks whether or not the IDc and the wireless channel information displayed on the display section 13 of the AP 10 match the IDc and the wireless channel information of the client to be authenticated. When they match each other, the user verifies the authentication using the input section 14 of the AP 10.

In this embodiment, the electronic signature SIGNc 1705 is decrypted, and when the integrity is confirmed, the IDc included in the received authentication request 1603 and the wireless channel information used for the reception by the transmission/reception section 11 are displayed on the display section 13 of the AP 10. Alternatively, the contents of the authentication request 1603 may be unconditionally displayed to check the matching of the information without using the electronic signature.

Figure 18:
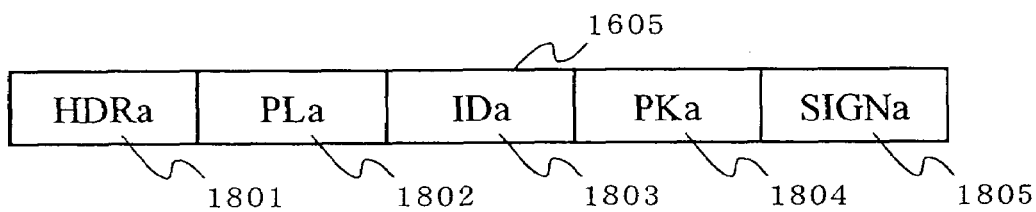
FIG. 18 shows an example of a format of an authentication response message.

When the authentication request 1603 is successful, an authentication response 1605 is returned from the AP 10 to the client 20. An example of the format of the authentication response 1605 is shown in FIG. 18. A PKa 1802 includes an authentication result. A PKa 1804 is a public key of the AP 10. An IDa 1803 is an ID of the AP 10. A SIGNa 1805 is a signature made for each field of the authentication response 1605 using the secret key and the electronic signature of the AP 10. The transmission/reception section 11 of the AP 10 obtains the public key PKa 1804 of the AP 10 from the public key/secret key generation section 111. The transmission/reception section 11 also obtains the SIGNa 1805 from the electronic signature section 112, and assembles the SIGNa 1805 with the IDa 1803 owned by the authentication section 12 to generate the authentication response 1605. The authentication response 1605 allows the public key PKa 1804 of the AP 10 to be transferred to the client 20.

After the AP 10 transmits the authentication response 1605, any one of all the predetermined wireless channels monitors whether or not a man-in-the-middle device transmits an authentication response 1605 including the same IDa. When such transmission is made, it is determined that the authentication response 1605 has been changed and transferred.

When the client 20 receives the authentication response 1605, the transmission/reception section 21 of the client 20 retrieves the public key PKa 1804 and the electronic signature SIGNa 1805 of the AP 10 included in the authentication response 1605, and transfers the public key PKa 1804 and the electronic signature SIGNa 1805 to the authentication section 22 of the client 20. The authentication section 22 checks the integrity of the message in substantially the same manner as the AP 10. When the integrity is confirmed, the authentication succeeds.

Second Specific Example

Figure 19:
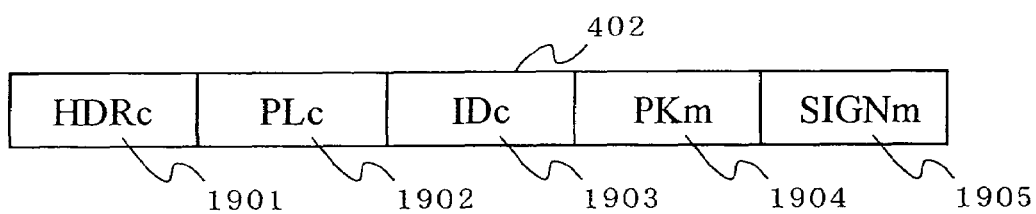
FIG. 19 shows an example of a format of an authentication request message which has been changed and forwarded.

The client 20 or the AP 10 monitors whether or not the authentication request message is changed and transferred by a man-in-the-middle device. In the case where the client 20 can receive all the messages transmitted by man-in-the-middle devices, it is effective that the client 20 performs the monitoring. In the case where the AP 10 can receive all the messages transmitted by the client 20 and all the messages transmitted by man-in-the-middle devices, it is effective that the AP 10 performs the monitoring. In the case where the client 20 monitors, the client 20 affirms that an act of changing and forwarding has been conducted by a man-in-the-middle device when an authentication request, which is received before an authentication response is returned from the AP 10 to the client 20, matches the authentication request transmitted by the client 20 itself except for the public key and the signature included therein. In the case where the AP 10 monitors, the AP 10 affirms that an act of changing and forwarding has been conducted by a man-in-the-middle device when the AP 10 receives two authentication requests which are exactly the same except for the public key and the signature within a predetermined time period. When the AP 10 receives an authentication request 402 as shown in FIG. 19, that means either that the AP 10 receives two authentication requests which are the same except for the public key PKm 1904 and the signature SIGNm 1905, or that the client 20 also receives the authentication request having the public key and the signature replacing those of the authentication request transmitted by the client 20 itself. In either case, it can be affirmed that an act of changing and forwarding has been conducted by a man-in-the-middle device.

Figure 20:
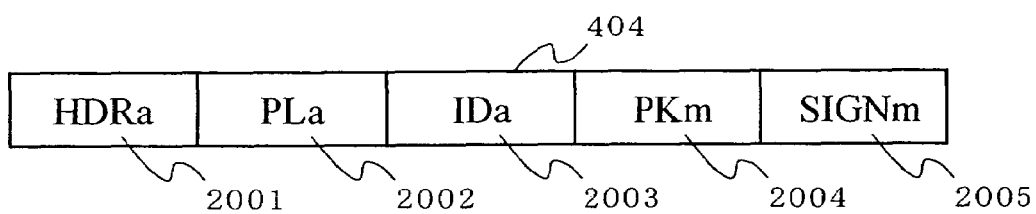
FIG. 20 shows an example of a format of an authentication response message which has been changed and forwarded.

For monitoring and affirming that an authentication response message is changed and forwarded, substantially the same method is usable as for an authentication request message except that the roles of the client 20 and the AP 10 are exchanged. When the client 20 receives an authentication response 404 as shown in FIG. 20, that means either that the client 20 receives two authentication responses which are the same except for the public key PKm 2004 and the signature SIGNm 2005, or that the AP 10 also receives the authentication response having the public key and the signature replacing those of the authentication response transmitted by the AP 10 itself. In either case, it can be affirmed that an act of changing and forwarding has been conducted by a man-in-the-middle device.

Third Specific Example

Figure 21:
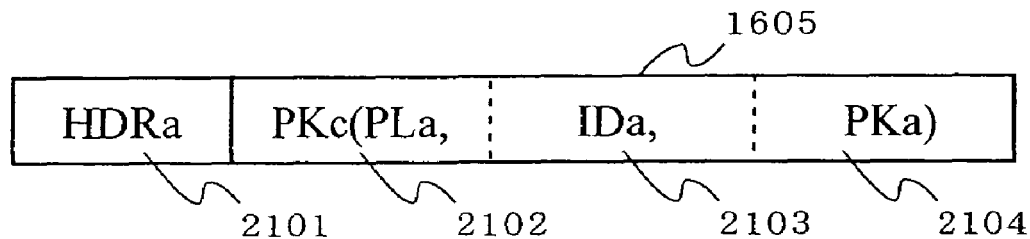
FIG. 21 shows an example of a format of an authentication response message.

An authentication response 1605 adopts, for example, a format as shown in FIG. 21. The encryption section 113 of the AP 10 encrypts authentication response information PLa 2102, a Public Key PKa 2104 of the AP 10, and an IDa 2103 of the AP 10 by the public key PKc of the client 20 received in the authentication request 1603, and transmits the authentication response 1605 to the client 20. Such an authentication response 1605 is only decrypted by the client 20 having a secret key which is paired with the public key PKc.

Figure 22:
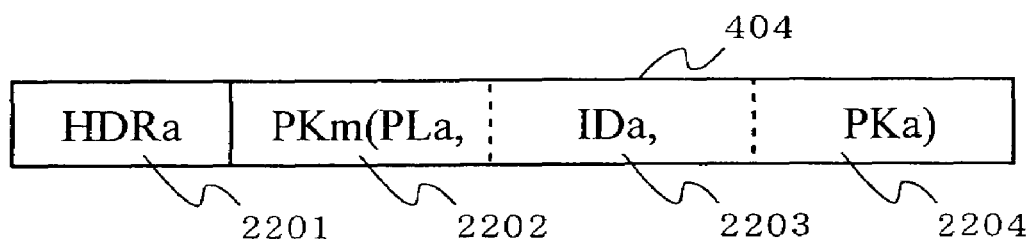
FIG. 22 shows an example of a format of an authentication response message which has been changed and forwarded.

In this case, it can be confirmed that the message is not changed by any man-in-the-middle device at the stage of transmitting the authentication request. Therefore, neither the client 20 nor the AP 10 receives the authentication response 404 as shown in FIG. 22. Even if a man-in-the-middle device attacks using such an authentication response at this stage, such an attack is merely ignored by the client 20 and does not do any harm.

Fourth Specific Example

As an ID of the client 20 or the AP 10, a random number generated by the pseudo random number generation sections 115 of the client 20 and the AP 10 is used each time a connection with the client is made. This has a higher degree of secrecy than the MAC address or the product number. It is possible to use a name defined by the user as the ID, but this requires the trouble of inputting the name beforehand and also the requires the user to set a name as unique as possible (a name different from that of the device in the neighboring house). When a random number is used, a different ID is used the next time the connection is made. Therefore, even if the ID is stolen, no problem occurs.

Fifth Specific Example

Figure 23:
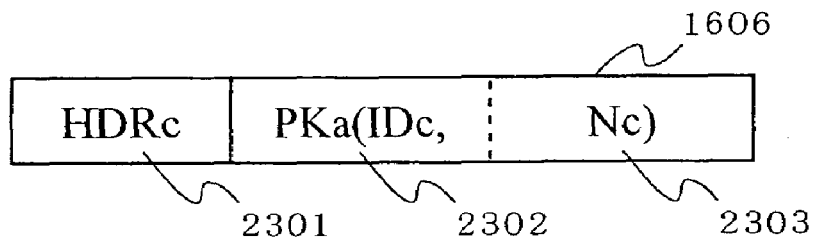
FIG. 23 shows an example of a format of a common encryption key generation request message.

When an authentication request is successful, the client 20 transmits a common encryption key generation request 1606 as shown in FIG. 23 to the AP 10. The common encryption key generation request 1606, except for a header HDRc 2301, is encrypted in the encryption section 113 of the client 20 using the public key PKa of the AP 10. An IDc 2302 is an ID of the client 20. A Nc 2303 is a random number (nonce) generated by the client 20. The encryption section 113 of the client 20 obtains and encrypts an IDc retained by the transmission/reception section 21 of the client 20 and the random number Nc generated by the pseudo random number generation section 115 of the client 20. The transmission/reception section 21 of the client 20 adds the header HDRc 2301 to the encrypted IDc and random number Nc, and transmits the resultant common encryption key generation request 1606. The transmission/reception section 11 of the AP 10 receives the common encryption key generation request 1606, and retrieves and transfers data to be decrypted to the decryption section 114. The decryption section 114 decrypts the data by its own secret key. With the decryption result, it is confirmed that the ID is the IDc of the client 20 authenticated before. In the case where this is confirmed, the AP 10 keeps the random number Nc obtained in the decryption result to be used for key generation later. Otherwise, the received common encryption key generation request 1606 is discarded and key generation is cancelled.

Figure 24:
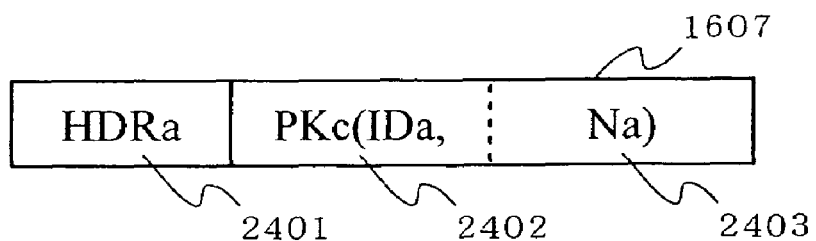
FIG. 24 shows an example of a format of a common encryption key generation response message.

When the AP 10 accurately receives the common encryption key generation request 1606 and confirms the authenticity thereof, the AP 10 returns a common encryption key generation response 1607 shown in FIG. 24 to the client 20. The common encryption key generation response 1607, except for a header HDRa 2401, is encrypted using the public key PKc of the client 20. An IDa 2402 is an ID of the AP 10. A Na 2403 is a random number generated by the AP 10. The encryption section 113 of the AP 10 obtains and encrypts an IDa retained by the transmission/reception section 11 of the AP 10 and the random number Nc generated by the pseudo random number generation section 115 of the AP 10. The transmission/reception section 11 of the AP 10 adds the header HDRa 2401 to the encrypted IDc and random number Na, and transmits the resultant common encryption key generation response 1607. The transmission/reception section 21 of the client 20 receives the common encryption key generation response 1607, and retrieves and transfers data to be decrypted to the decryption section 114. The decryption section 114 decrypts the data by its own secret key. With the decryption result, it is confirmed that the ID is the IDa of the AP 10 authenticated before. In the case where this is confirmed, the client 20 keeps the Na obtained in the decryption result to be used for key generation later. Otherwise, the received common encryption key generation response 1607 is discarded and key generation is cancelled.

Figure 16:
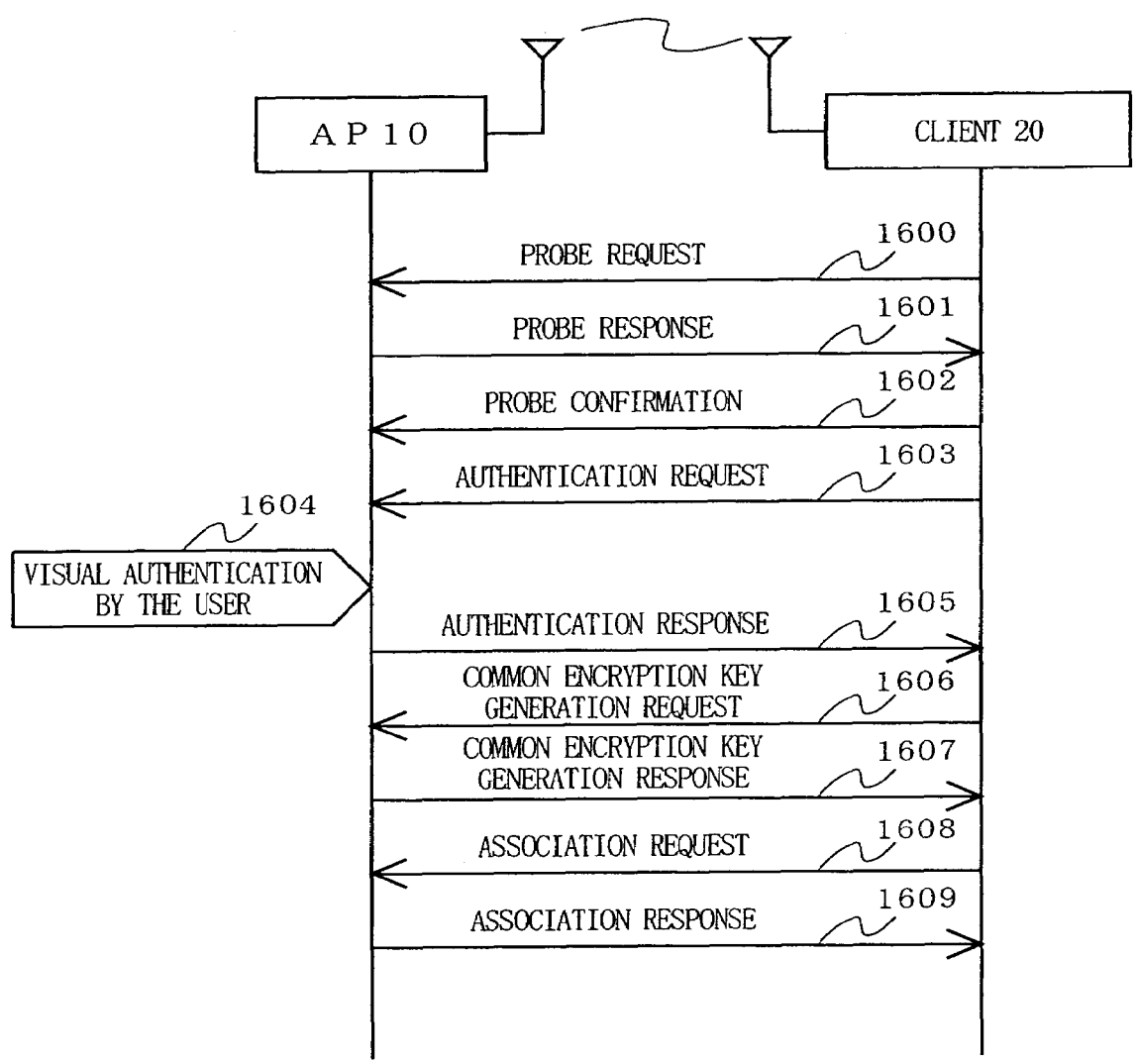
FIG. 16 is a flowchart showing processing of an authentication method according to a third embodiment of the present invention.

The common encryption key generation section 117 of each of the AP 10 and the client 20 generates a common key to be shared based on an ID or a MAC address and the random number. Thus, the AP 10 and the client 20 generate and share the same key. The common encryption key generated by the client 20 and the AP 10 is used for creation of association in the next step. Namely, an association request 1608 and an association response 1609 in FIG. 16 are encrypted by this key. The receiving side decrypts a received message using this key. The generated key is used for transmission and reception of control messages between the client 20 and the AP 10. Another key may be used for transmission and reception of data.

Figure 25:
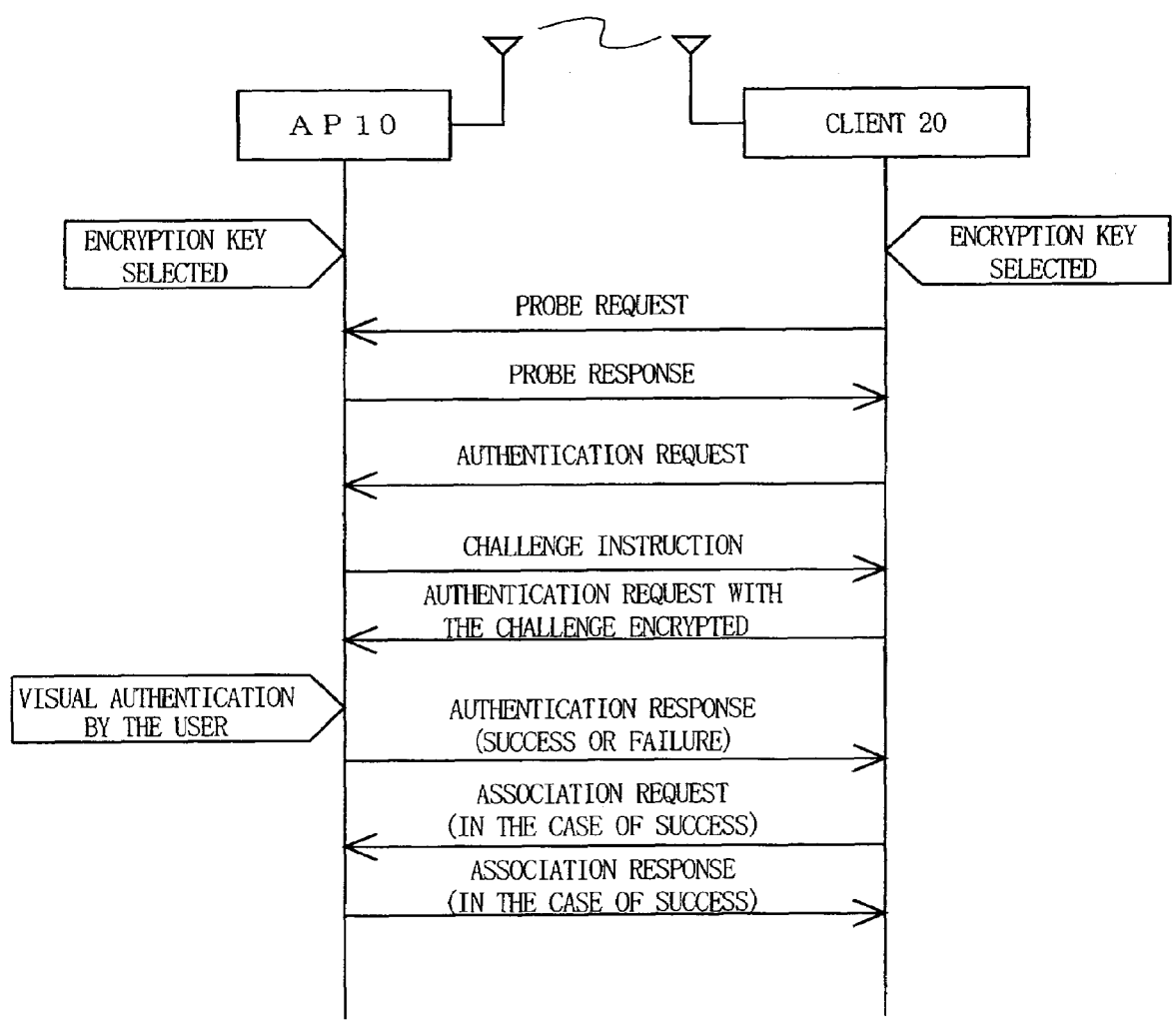
FIG. 25 is a sequence diagram showing an authentication procedure performed in a wireless LAN system according to another embodiment.

Before the probe request/response, both of the AP 10 and the client 20 may select the same encryption key to be used for the subsequent authentication. In this case, the selected encryption key is used to transmit a challenge instruction from the AP 10 to the client 20 and to transmit an authentication request with the challenge encrypted from the client 20 to the AP 10 (FIG. 25).

As the ID, a fixed number is usually used, but a random number may be used. A fixed number may be a number assigned to the client 20 beforehand, but may be independently set by the user for each client 20. The ID can be easily set via the input section 24.

Figure 26:
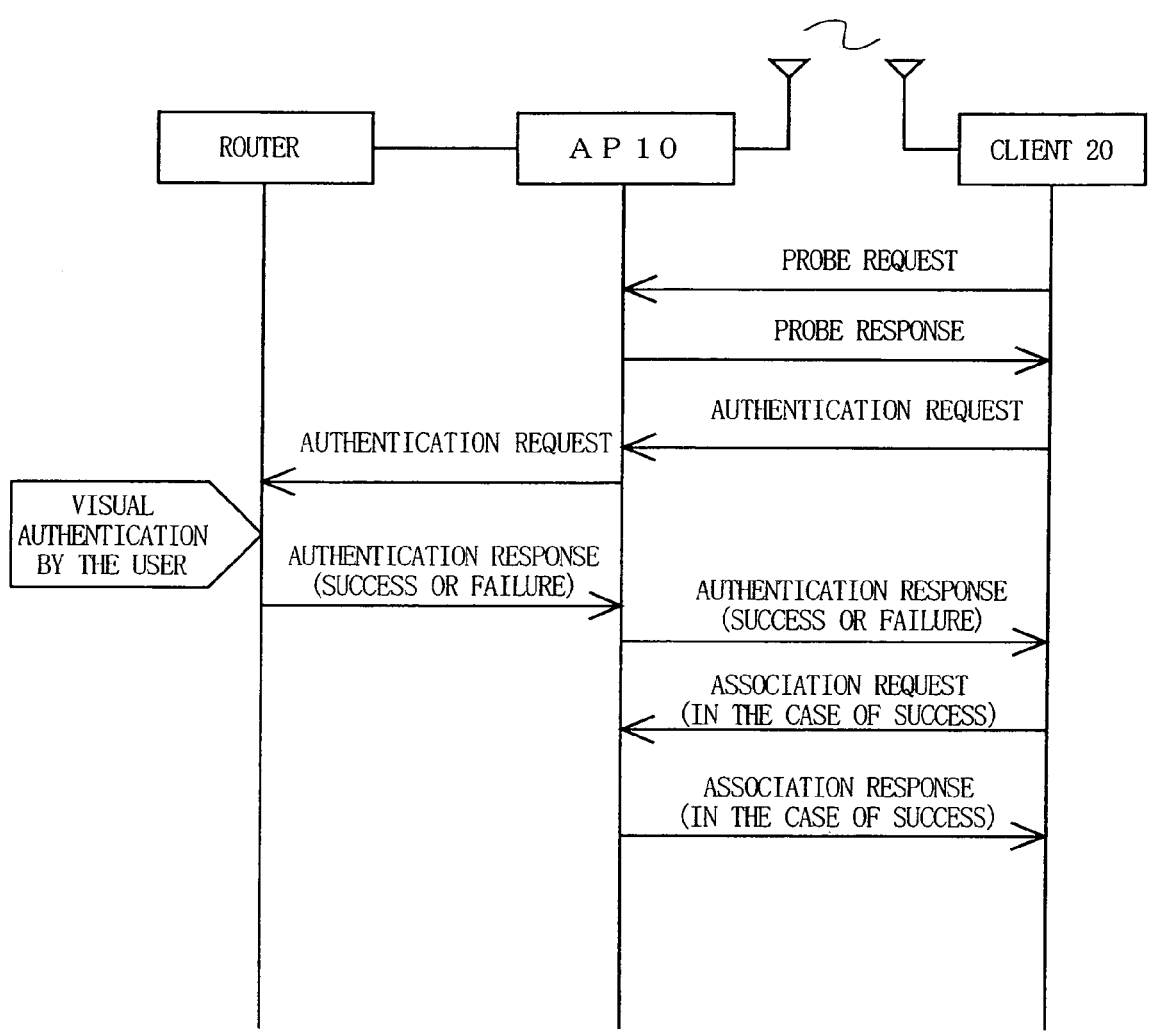
FIG. 26 is a sequence diagram showing an authentication procedure performed in a wireless LAN system according to still another embodiment.

The above-described structures and procedures are applicable to a system having a router or a home gateway as an upstream device to the AP 10 (FIG. 26). In this case, the router or the home gateway may include the display section 13 and the input section 14 of the AP 10 and perform substantially the same processing as performed by the AP 10. In such a system, the AP 10 does not need to have the authentication function and thus can have a simpler structure. In this case, the router or the home gateway is connected with the AP 10 via a secure communication path, and the AP has a relay function. The present invention is also applicable to connection of the router or the home gateway and the AP by a wireless LAN.

Related Other Embodiments

In the case where a plurality of APs are present in a network, when the client moves from one AP to a position close to another AP, the client needs to be re-connected with the another AP. For the re-connection, there are a case where authentication is newly performed and a case where authentication is not newly performed. When authentication is newly performed, authentication of the client is newly performed using one of the procedures described in the above embodiments. Therefore, it is not necessary to exchange information on the client, already authenticated, among the plurality of APs. By contrast, when authentication is not newly performed, the previous authentication needs to be reused. Therefore, it is necessary to exchange information on the authentication result on the client among the APs. When a past authentication result is reused, a plurality of embodiments are conceivable as follows depending on where the past authentication result is stored and how the past authentication result is reused.

There are the following systems for sharing ID information on clients: an AP sharing system by which all the APs share the ID information of all the clients authenticated, an AP decentralized management system by which each AP manages the ID information of only the client authenticated by itself and the ID information of all the clients is managed by all the APs in a decentralized manner, and a router sharing system by which the ID information of all the clients authenticated is stored in a router and shared.

Figure 27:
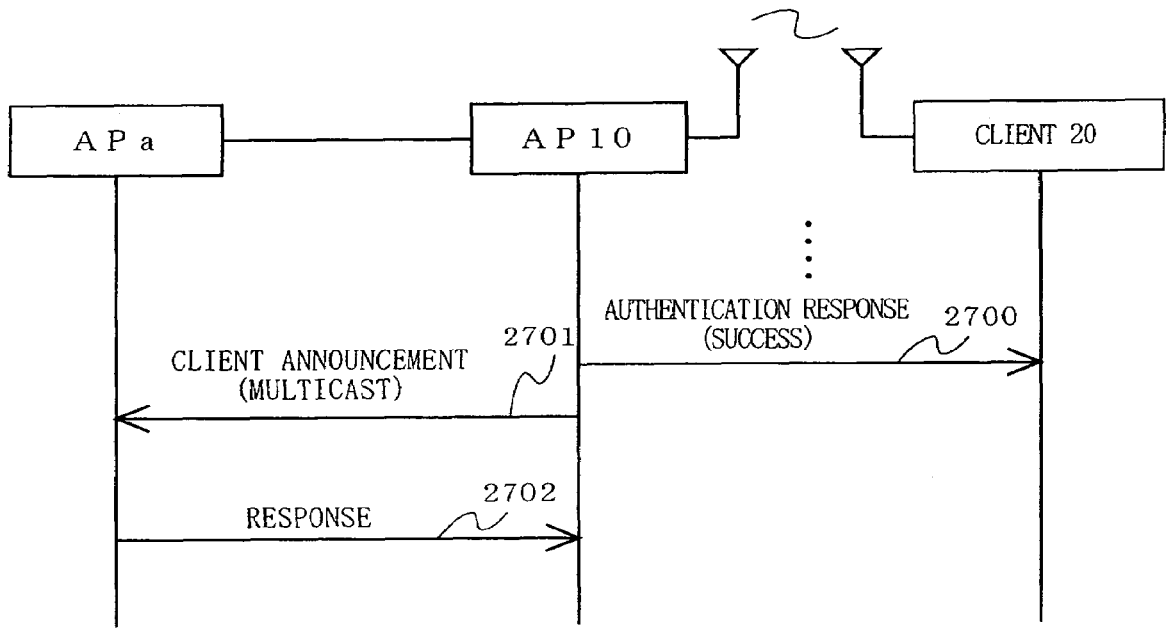
FIG. 27 is a sequence diagram showing an operation procedure by which APs share ID information of a client.
Figure 28:
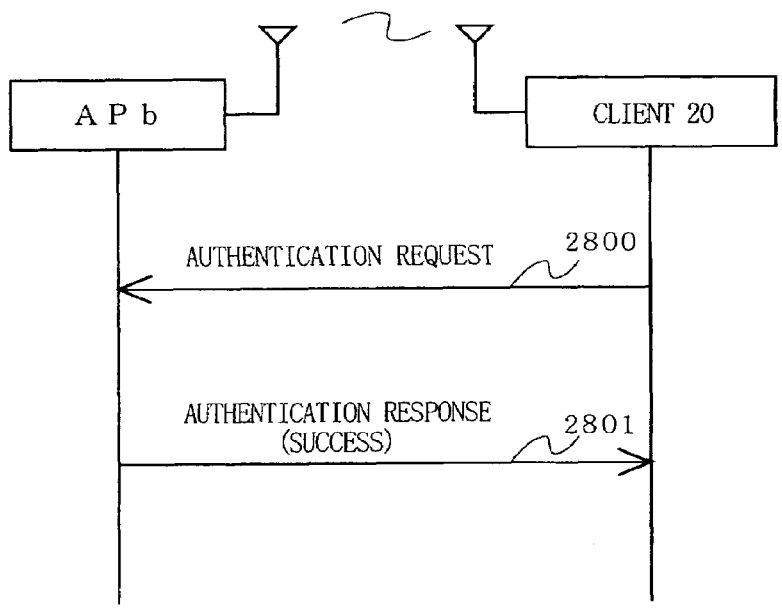
FIG. 28 is a sequence diagram showing an authentication procedure performed between an AP and the client when the APs share the ID information of the client.

The AP sharing system works as follows. As shown in FIG. 27, when a client 20 is successfully authenticated by the AP 10 by an authentication response (success) 2700, the AP 10 multicasts a client announcement 2701 carrying the ID of the authenticated client 20 to all the APa's in the network. Each APa which has received the client announcement 2701 may, but does not need to, return a response 2702 to the AP 10. The AP 10 owns the ID of the client 20 authenticated by itself as authenticated ID information, and is also notified by other APs of the IDs of authenticated clients by multicast messages and owns those IDs as authenticated ID information. Accordingly, all the APs own all the same authenticated ID information therein. Then, as shown in FIG. 28, when any one APb of the plurality of APa's receives an authentication request 2800 from a client 20, the APb checks whether or not the APb owns the authenticated ID information of the client 20. When the APb owns the authenticated ID information of the client 20, the APb determines that the client 20 has been authenticated and returns an authentication response 2801 (success) to the client 20. When the APb does not own the authenticated ID information of the client 20, the APb determines that this is the first time that the client 20 is to be authenticated, and executes any one of the authentication procedures described in the first through third embodiments.

Figure 29:
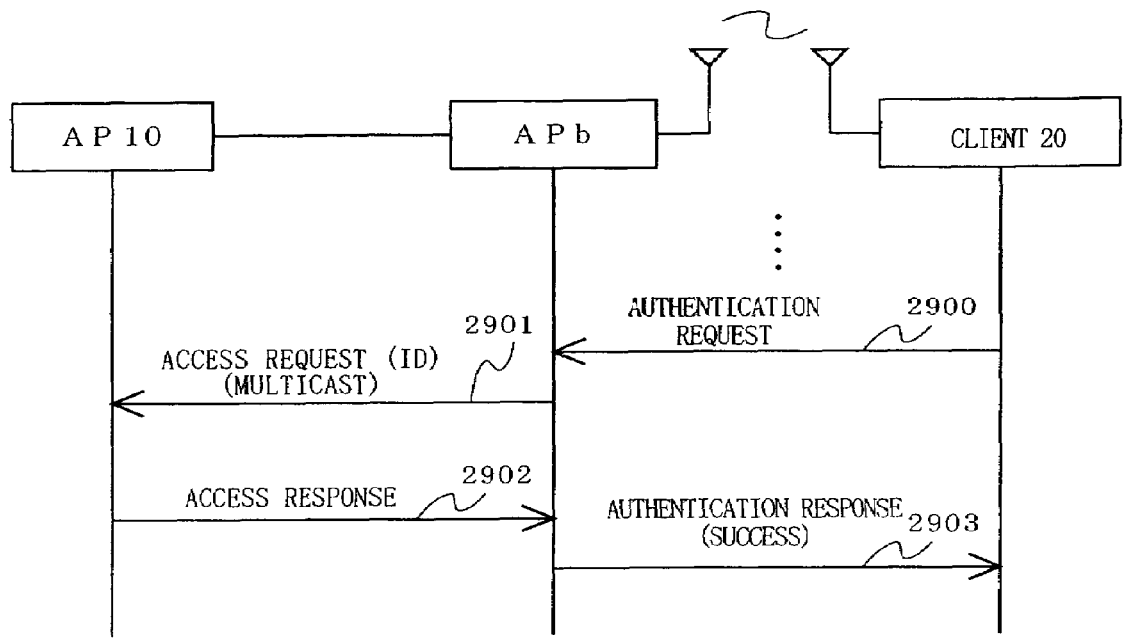
FIG. 29 is a sequence diagram showing an authentication procedure by which the ID information of the client is shared by all the APs in a decentralized manner.

The AP decentralized management system works as follows. After the AP completes authentication on a client, the AP does not multicast the IP information of the client to the other APs. As shown in FIG. 29, when an APb receives an authentication request 2900 from a client 20 and the APb does not have the ID information of the client 20 as the authenticated ID information, the APb multicasts an access request (ID) 2901 carrying the ID information of the client 20 to the other APs including the AP 10. Namely, the APb inquires the other APs whether they own the authenticated ID information. When an access response 2902 is returned from the AP 10 which was connected before with the client 20 within a designated time period, the APb determines that the client 20 has been authenticated and transmits an authentication request (success) 2903 to the client 20. When no access response is returned from any AP, the APb determines that the authentication request 2900 is the first request issued by the client 20 and executes an authentication procedure.

Figure 30:
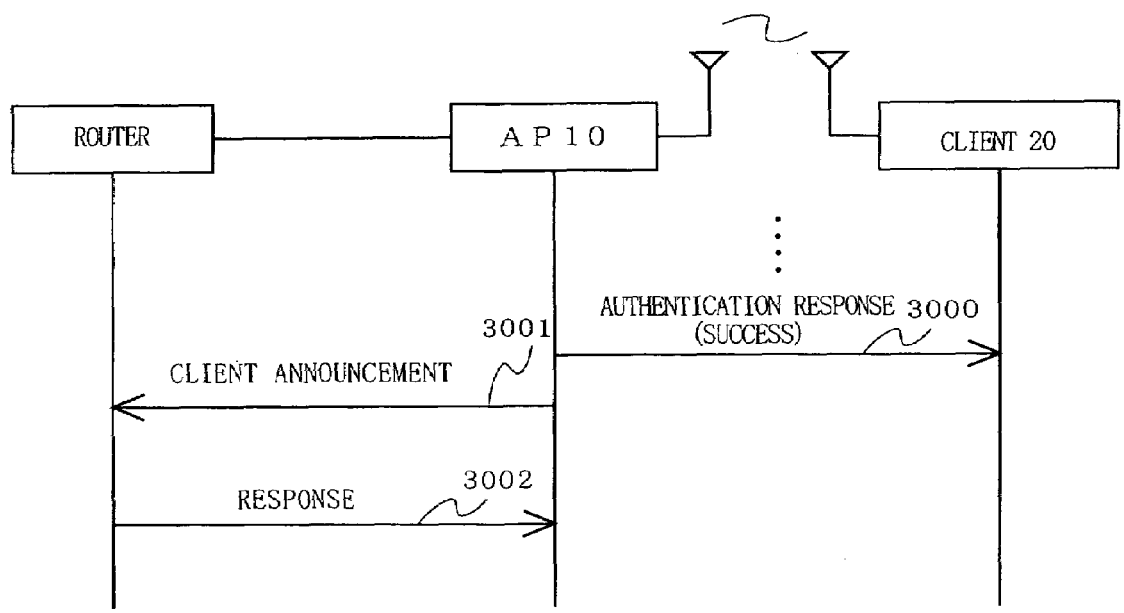
FIG. 30 is a sequence diagram showing an embodiment in which the ID information of the client is shared using a router.
Figure 31:
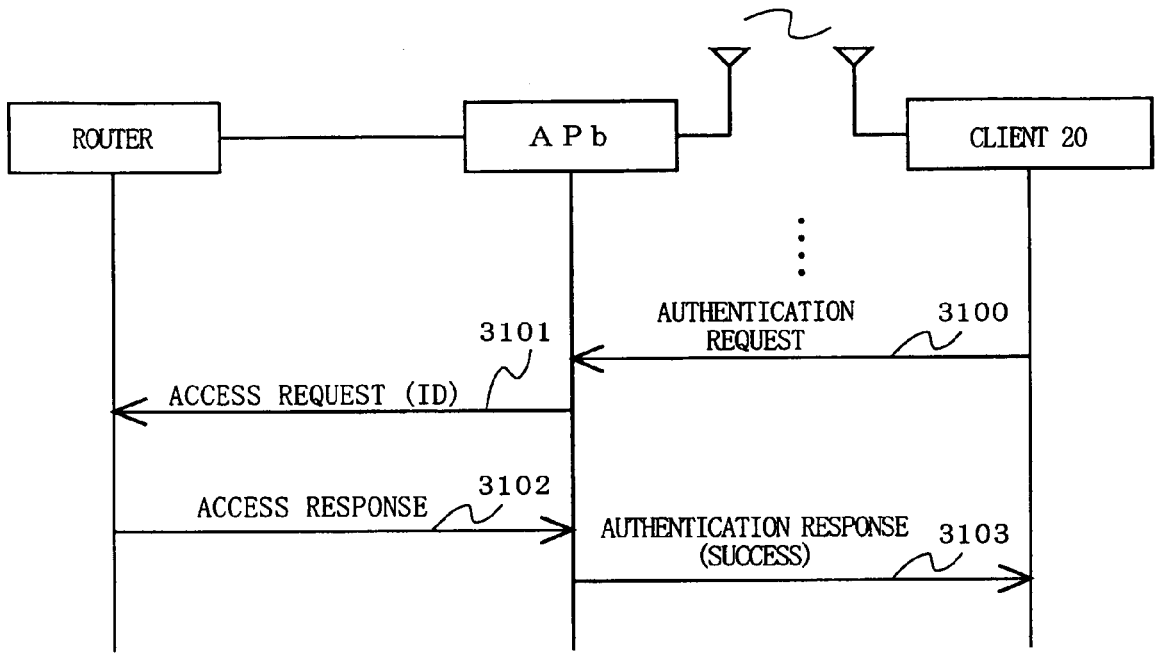
FIG. 31 is a sequence diagram showing an authentication procedure performed in the embodiment in which the ID information of the client is shared using the router.

The router sharing system works as follows. As shown in FIG. 30, after the AP 10 completes authentication on a client 20, the AP transmits a client announcement 3001 carrying the authenticated ID information of the client 20 to the router. The router, which has received the client announcement 3001, registers the ID of the client 20 in its own database as authenticated ID information and returns a response 3002. After this, the client 20 moves and attempts to be authenticated by an APb, which is a different AP from the AP which authenticated the client 20 before. In this case, as shown in FIG. 31, the APb transmits an access request (ID) 3101 carrying the ID information of the client 20 to the router upon receiving an authentication request 3100, because the client 20 is not its own client. The router, which has received the access request (ID) 3101, checks its own database to determine whether or not the authenticated ID information of the client 20 is registered. When the authenticated ID information is registered, the router determines that the client 20 has been authenticated and returns the result by an access response 3102 to the APb. When the authenticated ID information is registered, the access response 3102 indicates that the authentication succeeds. When the authenticated ID information is not registered, the access response 3102 indicates that the authentication does not succeed. When the access response 3102 indicates that the authentication succeeds, the APb transmits an authentication response (success) 3103 to the client 20. When the access response 3102 indicates that the authentication does not succeed, the APb determines that this is the first time that the client 20 is to be authenticated, and executes one of the authentication procedures described in the first through third embodiments.

With the AP sharing system and the AP decentralized management system, the APs are reliable to each other and are connected to one another by secure communication means. With the router sharing system, each AP and the router are reliable to each other and are connected to each another by secure communication means.

In each of the above-described embodiments, the user may not keep a client installed after the communication is terminated. In such a case, it is preferable that there is no old authenticated IDs remaining. A method for deleting old authenticated ID information will be described below.

Figure 32:
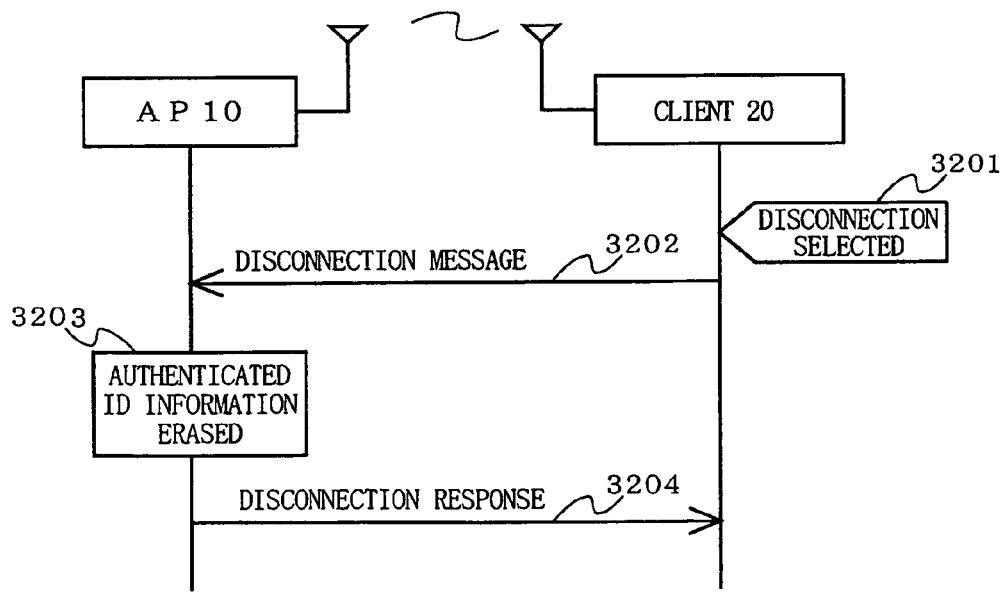
FIG. 32 is a sequence diagram showing an operation of erasing authenticated ID information of a client by connection disruption.

In order to permanently separate the client from the network, as shown in FIG. 32, the client 20 transmits a disconnection message 3202 with its own ID to the AP 10. The AP 10, which has received the disconnection message 3202, deletes the ID information of the client 20 from its own database by a procedure 3203. All is needed to realize this is that the client 20 is set so as to transmit a disconnection message to AP 10 when the user selects to disrupt the connection, so that the ID information of the client 20 is erased from the authenticated ID information stored in the devices in the network.

Figure 33:
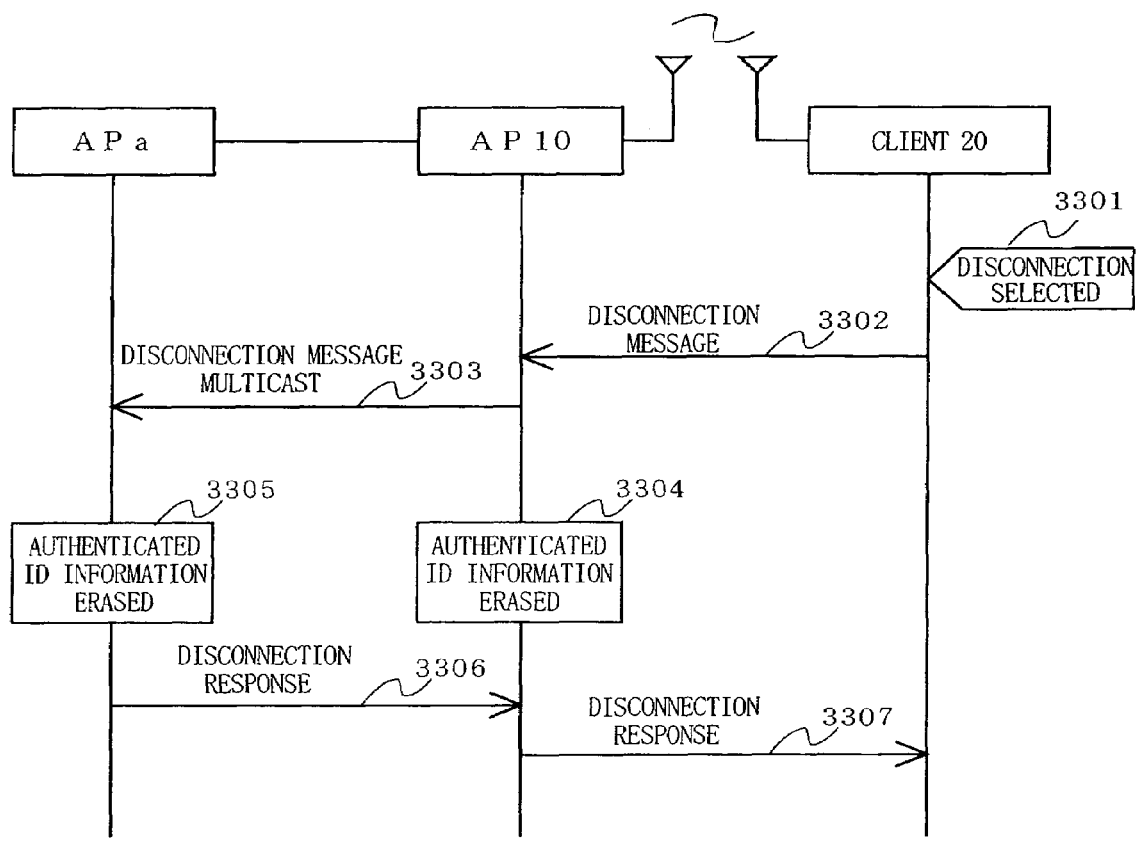
FIG. 33 is a sequence diagram showing an operation of erasing authenticated ID information of a client stored in a plurality of APs by connection disruption.

In the case of the AP sharing system or the AP decentralized management system by which other APs other than the AP 10 share the authenticated ID information, as shown in FIG. 33, the AP 10 which has received a disconnection message 3302 notifies the authenticated ID information to be erased to the APa's by a multicast disruption message 3303 to request the erasure of the authenticated ID information, and the APa which has received the erasure request erases the authenticated ID information when storing such ID information. The AP 10, which first received the disconnection message 3302, also erases the ID information of the client 20 as the authenticated ID information by a procedure 3304 when storing such ID information. After erasing the authenticated ID information, the APa returns a disconnection response message 3306 to the AP 10. Then, the AP 10 returns a disconnection response message 3307 to the client 20.

Figure 34:
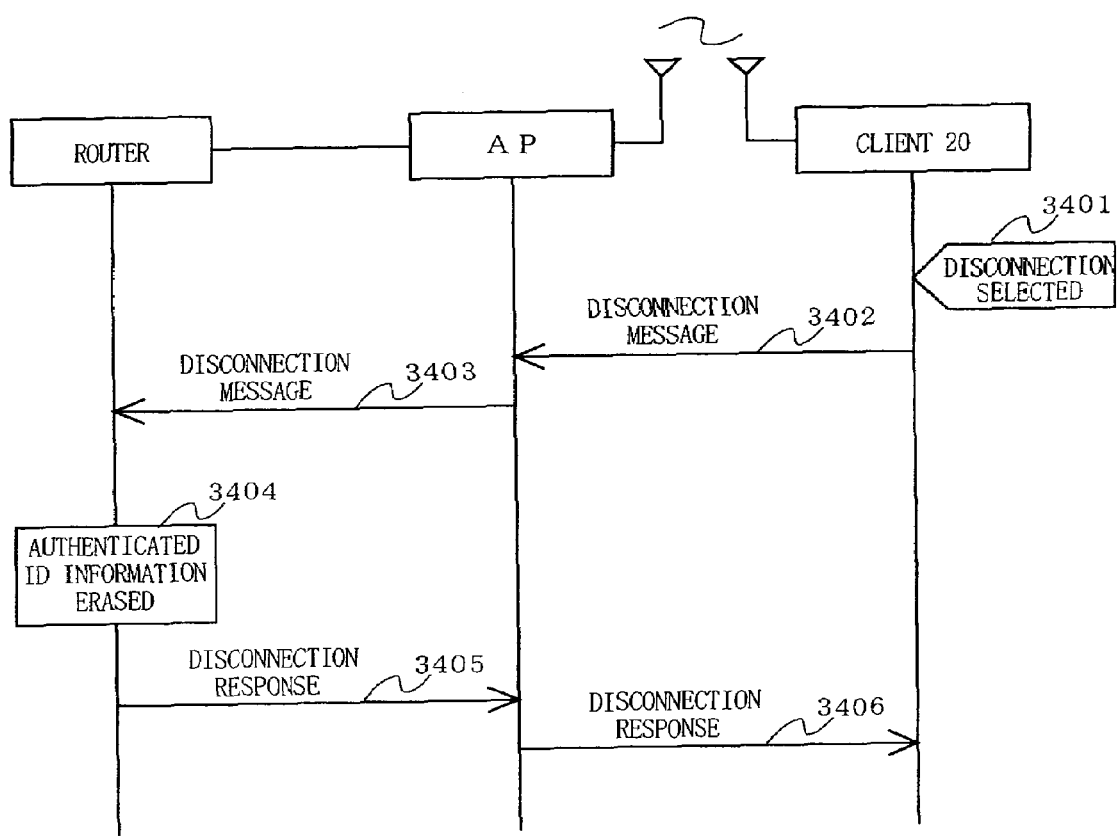
FIG. 34 is a sequence diagram showing an operation of erasing authenticated ID information of a client stored in the router by connection disruption.
Figure 35:
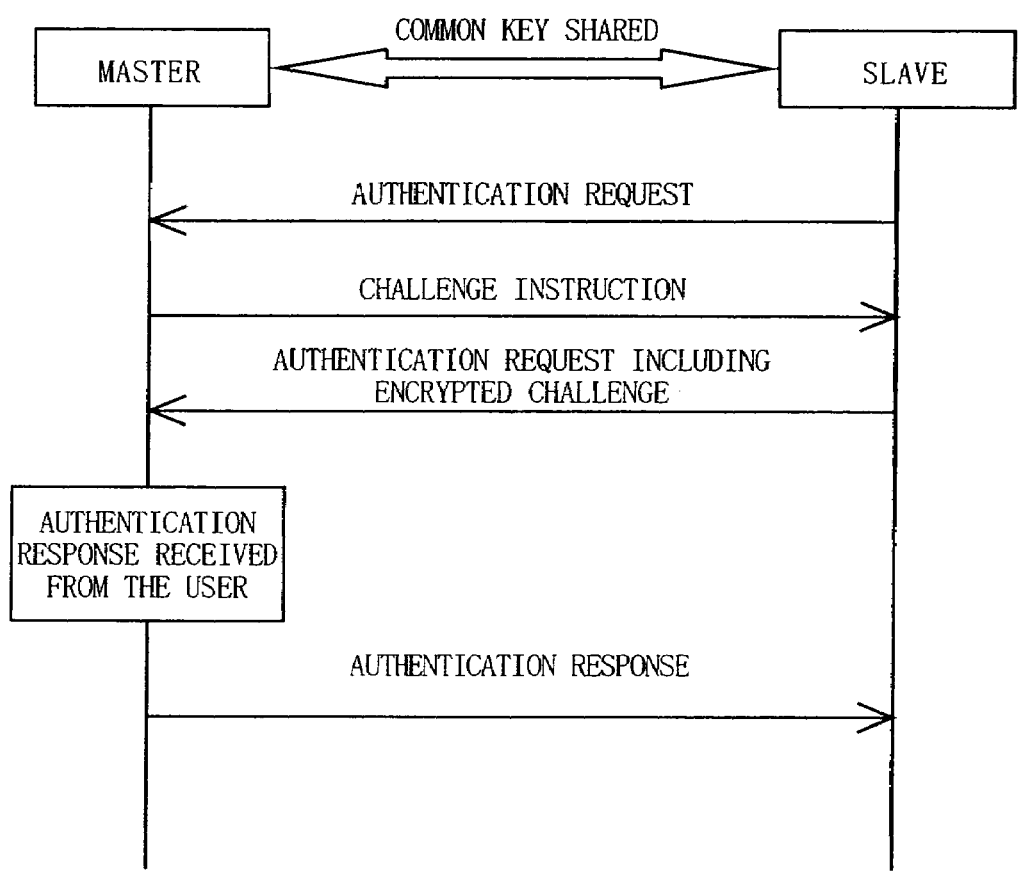
FIG. 35 is a flowchart showing an example of processing of a conventional authentication method.
Figure 36:
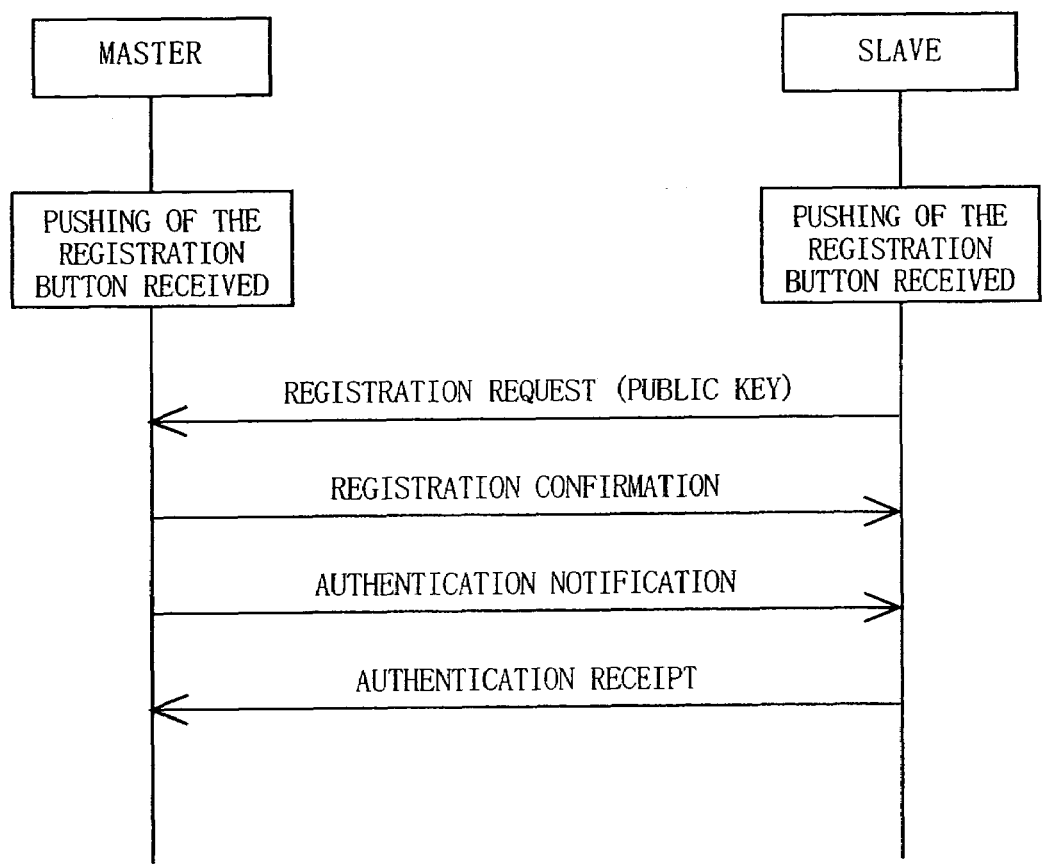
FIG. 36 is a flowchart showing an example of processing of a conventional authentication method.
Figure 37:
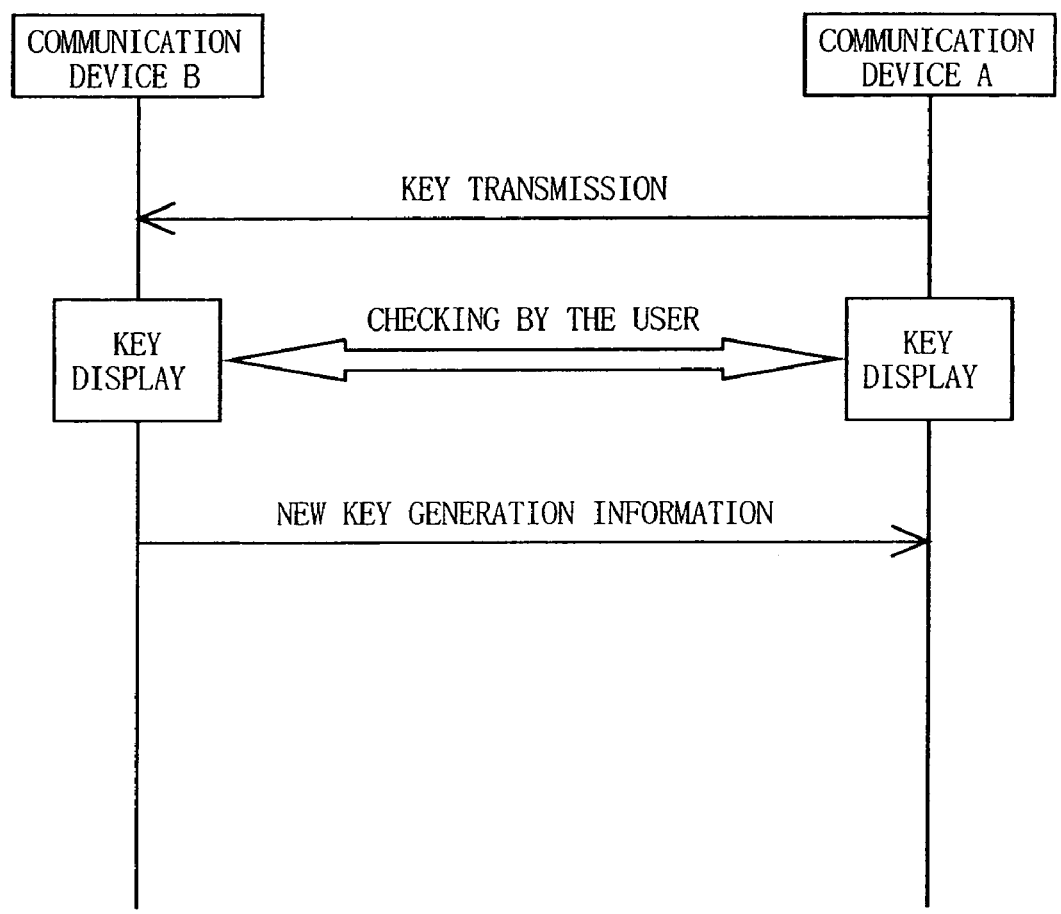
FIG. 37 is a flowchart showing an example of processing of a conventional authentication method.

With the router sharing system by which the router stores the authenticated ID information, as shown in FIG. 34, the client 20 transmits a disconnection message 3402 with its own ID information to the closest AP. The AP forwards the disconnection message 3402 as a disconnection message 3403 to the router. The router checks whether or not the received ID information is authenticated ID information.

When the received ID information is authenticated ID information, the router erases the ID information by a procedure 3404. Then, the router returns a disconnection response 3405 to the AP, and the AP forwards the disconnection response 3405 as a disconnection response 3406 to the client 20.

In the case where the user intends to permanently separate the client by, for example, turning off the power source without performing disconnection processing for the client, the user may use a function of the AP or the router of directly deleting the ID of the client. All is needed to realize this is that the AP or the router includes a display section for displaying authenticated ID information and an operation section for deleting any of the displayed authenticated ID information, such that authentication of a predetermined or desired client can be cancelled from the authenticated ID information stored in the devices in the network. In the case of a system of storing authenticated ID information in a plurality of access points, the authenticated ID information to be erased may be notified by a multicast erasure request message. The AP or the router, which has received the erasure request, erases the authenticated ID information to be erased when storing such ID information.

In the above embodiments, in the case where an AP performs authentication and a plurality of APs are installed at various positions in the house, the user needs to move to the position of the particular AP. The user does not need to move in the case where the information on the display section of the AP can be viewed by a remote control at hand. This is realized by setting a secure wireless communication path between the remote control and the AP. Since the remote control only needs to have a function of confirming the ID information and instructing to verify the authentication, a simple transmission path can be used with no encryption or the like. All is needed to realize this is that a display section and an authentication section of the AP is provided on the remote control and that a communication path is set between the main body of the AP and the remote control, such that the user can input authentication to the remote control at hand. In the case of a system by which the router performs authentication also, substantially the same remote control structure is usable for substantially the same procedure.

The remote control may be inserted into a connection section provided in the main body of the AP or the router so as to directly connect the remote control to the main body. With such a structure, the remote control can be detached from the main body for authentication and the user can move. When the remote control is detached from the main body, a common key R for remote control wireless communication may be determined between the main body and the remote control. In the communication between the main body and the remote control, which is performed for the subsequent authentication process, including transmission of ID information to be displayed, transmission of input operation information indicating that the authentication is verified, and transmission of the encryption key number for encryption key selection, the common key R can be used to encrypt and decrypt the transmission data. In this way, the contents of data are not known to any man-in-the-middle. The common key R can be newly determined each time the remote control is detached from the main body. Thus, a secure communication path can be realized.

There are various possible methods for setting a common key R when detaching the remote control from the main body. According to one exemplary method, a switch for sensing the movement of the remote control when the remote control is detached from the main body is provided in the main body. When the switch senses the movement, the main body immediately supplies a new common key R to the remote control. According to another exemplary method, the value of the common key R is periodically changed in the state where the remote control is inserted into the main body, and the newest common key R is usable when the remote control is detached from the main body. Since the value of the common key R can be changed in the state where the remote control and the main body are in a wired connection to each other, there is no substantial risk of the common key R being stolen.

There is a possibility that the user leaves unattended or loses the remote control. Therefore, either or both of the main body and the remote control may output an alarm sound when the remote control is detached from the main body for a predetermined time period or longer. Alternatively, it may be set that the communication application of the client cannot be started until the remote control is inserted back into the main body after authentication.

INDUSTRIAL APPLICABILITY

The present invention is usable for a communication network system or the like for performing authenticated connection between communication devices, and is especially suitable for realizing both security improvement and simplification of security setting in authentication processing.

The invention claimed is:

1. A master communication device requested for authentication for connection from at least one slave communication device, the master communication device comprising:
   a receiving section for receiving, from a slave communication device among any one of the at least one slave communication device, an authentication request including device information by which the slave communication device is capable of being determined to be a source, and for monitoring and determining whether or not the authentication request is changed by an unspecified third party while being transmitted;
   a display section for, when it is determined that the authentication request is not changed, displaying the device information included in the authentication request on a screen thereof;
   an input section for receiving, from a user, an input of a determination result obtained based on the displayed device information, by allowing the user to determine whether or not to verify the authentication with the slave communication device which is a source of the authentication request determined not to be changed;
   a transmission section for transmitting an authentication response including information indicative of verification or non-verification of the authentication with the slave communication device in accordance with the determination result input to the input section; and
   an authentication section for, when the information included in the authentication response is indicative of verification of the authentication, performing key exchange with the slave communication device using the device information included in the authentication request and the information included in the authentication response.

2. The communication device according to claim 1, wherein the display section further displays channel information used for reception of the authentication request, in addition to the device information included in the authentication request, thereby making it possible for the user to determine whether or not the authentication request is transferred using another channel by the unspecified third party.

3. The communication device according to claim 1, wherein the user is able to determine, based on whether or not the authentication request is received a plurality of times and whether or not a public key and a signature in the device information included in the authentication request are changed, whether or not the received authentication request is changed by the unspecified third party.

4. A slave communication device requesting a master communication device for authentication for connection, the slave communication device comprising:
 a transmission section for transmitting an authentication request including device information indicative of the slave communication device to the master communication device;
 a receiving section for receiving, from the master communication device, an authentication response corresponding to the authentication request and including device information by which the master communication device is capable of being determined to be a source, and for monitoring and determining whether or not the authentication response is changed by an unspecified third party while being transmitted;
 a display section for, when it is determined that the authentication response is not changed, displaying the device information included in the authentication response on a screen thereof;
 an input section for receiving, from a user, an input of a determination result obtained based on the displayed device information, by allowing the user to determine whether or not to verify the authentication with the master communication device which is a source of the authentication response determined not to be changed; and
 an authentication section for executing processing of verifying or not verifying the authentication with the master communication device in accordance with the determination result input to the input section, and for, when the determination result is indicative of verification of the authentication, further performing key exchange with the master communication device using the device information included in the authentication request and the authentication response.

5. The communication device according to claim 4, wherein the display section further displays channel information used for reception of the authentication response, in addition to the device information included in the authentication response, thereby making it possible for the user to determine whether or not the authentication response is transferred using another channel by the unspecified third party.

6. The communication device according to claim 4, wherein the user is able to determine, based on whether or not the authentication response is received a plurality of times and whether or not a public key and a signature in the device information included in the authentication response are changed, whether or not the received authentication response is changed by the unspecified third party.

7. A communication system for executing authentication processing for connecting a slave communication device to a master communication device, wherein:
 the slave communication device includes:
  a transmission section for transmitting an authentication request including device information by which the slave communication device is capable of being determined to be a source to the master communication device;
  a receiving section for receiving, from the master communication device, an authentication response corresponding to the authentication request and including device information indicative of verification or non-verification of the authentication with the slave communication device, and for monitoring and determining whether or not the authentication response is changed by an unspecified third party while being transmitted; and
  an authentication section for, when it is determined that the authentication response is not changed, executing processing of verifying or not verifying the authentication with the master communication device in accordance with the authentication response, and for, when the device information included in the authentication response is indicative of verification of the authentication, further performing key exchange with the master communication device using the device information included in the authentication request and the authentication response; and
 the master communication device includes:
  a receiving section for receiving the authentication request from the slave communication device, and for monitoring and determining whether or not the authentication request is changed by an unspecified third party while being transmitted;
  a display section for, when it is determined that the authentication request is not changed, displaying the device information included in the authentication request on a screen thereof;
  an input section for receiving, from a user, an input of a determination result obtained based on the displayed device information, by allowing the user to determine whether or not to verify the authentication with the slave communication device which is a source of the authentication request determined not to be changed;
  a transmission section for transmitting the authentication response in accordance with the determination result input to the input section; and
  an authentication section for, when the device information included in the authentication response is indicative of verification of the authentication, performing key exchange with the slave communication device using the device information included in the authentication request and the authentication response.

8. The communication system according to claim 7, wherein the display section further displays channel information used for reception of the authentication request, in addition to the device information included in the authentication request, thereby making it possible for the user to determine whether or not the authentication request is transferred using another channel by the unspecified third party.

9. The communication system according to claim 7, wherein the user is able to determine, based on whether or not the authentication request is received a plurality of times and whether or not a public key and a signature in the device information included in the authentication request are changed, whether or not the received authentication request is changed by the unspecified third party.

10. A communication system for executing authentication processing for connecting a slave communication device to a master communication device, wherein:
 the slave communication device includes:
  a transmission section for transmitting an authentication request including device information indicative of the slave communication device to the master communication device;
  a receiving section for receiving, from the master communication device, an authentication response corresponding to the authentication request and including device information by which the master communication device is capable of being determined to be a source, and for monitoring and determining whether or not the authentication response is changed by an unspecified third party while being transmitted;

a display section for, when it is determined that the authentication response is not changed, displaying the device information included in the authentication response on a screen thereof;

an input section for receiving, from a user, an input of a determination result obtained based on the displayed device information, by allowing the user to determine whether or not to verify the authentication with the master communication device which is a source of the authentication response determined not to be changed; and an authentication section for executing processing of verifying or not verifying the authentication with the master communication device in accordance with the determination result input to the input section, and for, when the determination result is indicative of verification of the authentication, further performing key exchange with the master communication device using the device information included in the authentication request and the authentication response; and the master communication device includes:

a receiving section for receiving the authentication request from the slave communication device, and monitoring and determining whether or not the authentication request is changed by an unspecified third party while being transmitted;

a transmission section for transmitting the authentication response corresponding to the authentication request to the slave communication device; and an authentication section for, when the authentication is verified by the slave communication device, performing key exchange with the slave communication device using the device information included in the authentication request and the authentication response.

11. The communication system according to claim 10, wherein the display section further displays channel information used for reception of the authentication response, in addition to the device information included in the authentication response, thereby making it possible for the user to determine whether or not the authentication response is transferred using another channel by the unspecified third party.

12. The communication system according to claim 10, wherein the user is able to determine, based on whether or not the authentication response is received a plurality of times and whether or not a public key and a signature in the device information included in the authentication response are changed, whether or not the received authentication response is changed by the unspecified third party.

13. An authentication method for executing authentication processing for connecting a slave communication device to a master communication device, the authentication method comprising the steps of:

the slave communication device transmitting an authentication request including device information by which the slave communication device is capable of being determined to be a source to the master communication device;

the master communication device receiving the authentication request from the slave communication device, and monitoring and determining whether or not the authentication request is changed by an unspecified third party while being transmitted;

the master communication device displaying the device information included in the authentication request on a screen thereof when it is determined that the authentication request is not changed;

the master communication device receiving, from a user, an input of a determination result obtained based on the displayed information, by allowing the user to determine whether or not to verify the authentication with the slave communication device which is a source of the authentication request determined not to be changed;

the master communication device transmitting an authentication response including information indicative of verification or non-verification of the authentication with the slave communication device in accordance with the input determination result;

the slave communication device receiving the authentication response corresponding to the authentication request from the master communication device, and monitoring and determining whether or not the authentication response is changed by an unspecified third party while being transmitted;

the slave communication device executing processing of verifying or not verifying the authentication with the master communication device in accordance with the authentication response when it is determined that the authentication response is not changed; and the slave communication device and the master communication device performing key exchange with each other using the device information included in the authentication request and the information included in the authentication response when the information included in the authentication response is indicative of verification of the authentication.

14. The authentication method according to claim 13, wherein the step of displaying the device information included in the authentication request further includes displaying channel information used for reception of the authentication request, thereby making it possible for the user to determine whether or not the authentication request is transferred using another channel by the unspecified third party.

15. The authentication method according to claim 13, wherein the step of monitoring and determining whether or not the received authentication request is transmitted by the unspecified third party includes enabling the user to determine, based on whether or not the authentication request is received a plurality of times and whether or not a public key and a signature in the device information included in the authentication request are changed, whether or not the received authentication response is changed by the unspecified third party.

16. An authentication method for executing authentication processing for connecting a slave communication device to a master communication device, the authentication method comprising the steps of:

the slave communication device transmitting an authentication request including device information indicative of the slave communication device to the master communication device;

the master communication device receiving the authentication request from the slave communication device, and monitoring and determining whether or not the authentication request is changed by an unspecified third party while being transmitted;

the master communication device transmitting an authentication response corresponding to the authentication request and including device information by which the master communication device is capable of being determined to be a source to the slave communication device;

the slave communication device receiving the authentication response corresponding to the authentication request from the master communication device, and monitoring and determining whether or not the authentication response is changed by an unspecified third party while being transmitted;

the slave communication device displaying the device information included in the authentication response on a screen thereof when it is determined that the authentication response is not changed;

the slave communication device receiving, from a user, an input of a determination result obtained based on the displayed device information, by allowing the user to determine whether or not to verify the authentication with the master communication device which is a source of the authentication response determined not to be changed;

the slave communication device executing processing of verifying or not verifying the authentication with the master communication device in accordance with the input determination result; and the slave communication device and the master communication device performing key exchange with each other using the device information included in the authentication request and the authentication response when the determination result is indicative of verification of the authentication.

17. The authentication method according to claim 16, wherein the step of displaying the device information included in the authentication response further includes displaying channel information used for reception of the authentication response, thereby making it possible for the user to determine whether or not the authentication response is transferred using another channel by the unspecified third party.

18. The authentication method according to claim 16, wherein the step of monitoring and determining whether or not the received authentication response is transmitted by the unspecified third party includes enabling the user to determine, based on whether or not the authentication response is received a plurality of times and whether or not a public key and a signature in the device information included in the authentication response are changed, whether or not the received authentication response is changed by the unspecified third party.

* * * * *